(12) United States Patent
Kiuchi et al.

(10) Patent No.: US 9,513,839 B2
(45) Date of Patent: Dec. 6, 2016

(54) MANAGEMENT SYSTEM AND MANAGEMENT METHOD FOR COMPUTER SYSTEM COMPRISING REMOTE COPY SYSTEM FOR PERFORMING ASYNCHRONOUS REMOTE COPY

(71) Applicant: Hitachi, Ltd., Tokyo (JP)

(72) Inventors: Sayuri Kiuchi, Tokyo (JP); Tomoki Mizuno, Tokyo (JP)

(73) Assignee: HITACHI, LTD., Tokyo (JP)

( * ) Notice: Subject to any disclaimer, the term of this patent is extended or adjusted under 35 U.S.C. 154(b) by 278 days.

(21) Appl. No.: 14/395,153

(22) PCT Filed: Apr. 3, 2014

(86) PCT No.: PCT/JP2014/059851
§ 371 (c)(1),
(2) Date: Oct. 17, 2014

(87) PCT Pub. No.: WO2015/151258
PCT Pub. Date: Oct. 8, 2015

(65) Prior Publication Data
US 2016/0259558 A1  Sep. 8, 2016

(51) Int. Cl.
*G06F 11/00* (2006.01)
*G06F 3/06* (2006.01)
(Continued)

(52) U.S. Cl.
CPC .............. *G06F 3/065* (2013.01); *G06F 3/06* (2013.01); *G06F 3/067* (2013.01); *G06F 3/0619* (2013.01);
(Continued)

(58) Field of Classification Search
CPC . G06F 11/008; G06F 11/2074; G06F 11/3006; G06F 11/3034; G06F 11/324; G06F 11/328; G06F 11/3419; G06F 3/0619; G06F 3/065; G06F 3/0653; G06F 3/067; G06F 2201/855
See application file for complete search history.

(56) References Cited

U.S. PATENT DOCUMENTS 9,202,304 B1 * 12/2015 Baenziger ............... G06T 15/06
2005/0060574 A1 * 3/2005 Klotz ..................... H04L 41/22
726/4
(Continued)

FOREIGN PATENT DOCUMENTS

JP  2006-079488 A  3/2006
JP  2007-128293 A  5/2007
(Continued)

OTHER PUBLICATIONS

SAN Performance Metrics, Sep. 25, 2012, The SAN Guy, https://thesanguy.com/2012/09/25/san-performance-metrics/.*
(Continued)

*Primary Examiner* — Marc Duncan
(74) *Attorney, Agent, or Firm* — Volpe and Koenig, P.C.

(57) ABSTRACT

A management system comprises management information. The management information includes a plurality of delay durations that respectively correspond to a plurality of times, and a plurality of metric values that respectively correspond to the plurality of times for a primary volume. The management system, based on the management information, displays a delay duration graph (521) representing a fluctuation in delay duration associated with the passage of time and an average-of-writing-quantity graph (524) representing a fluctuation in average of writing quantity associated with the passage of time, in a mode that enables comparison between the two graphs. The average of writing quantity is an amount of data written to the primary volume per write request.

13 Claims, 16 Drawing Sheets

(51) Int. Cl.
  *G06F 3/14*    (2006.01)
  *G06F 11/30*   (2006.01)
  *G06F 11/32*   (2006.01)

(52) U.S. Cl.
  CPC ......... *G06F 3/1454* (2013.01); *G06F 11/3006* (2013.01); *G06F 11/328* (2013.01); *G09G 2370/022* (2013.01)

(56) References Cited

U.S. PATENT DOCUMENTS

| | | | | |
|---|---|---|---|---|
| 2006/0277384 | A1* | 12/2006 | Yagawa | G06F 11/3428 711/170 |
| 2007/0038825 | A1* | 2/2007 | Kawamura | G06F 11/2074 711/162 |
| 2008/0244035 | A1* | 10/2008 | Horie | G06F 3/0613 709/217 |
| 2009/0171731 | A1* | 7/2009 | Bobak | G06Q 10/06 705/7.23 |
| 2010/0153666 | A1 | 6/2010 | Emaru et al. | |
| 2010/0228888 | A1 | 9/2010 | Uchi et al. | |
| 2011/0029748 | A1* | 2/2011 | Nakamura | G06F 11/1451 711/162 |
| 2012/0120078 | A1* | 5/2012 | Hubbard | G06T 11/206 345/440.2 |
| 2012/0254568 | A1* | 10/2012 | Harris, Jr. | G06F 11/2064 711/162 |
| 2013/0019197 | A1* | 1/2013 | Brugler | G06T 11/206 715/772 |
| 2015/0058092 | A1* | 2/2015 | Rea | G06Q 10/0639 705/7.38 |
| 2015/0248407 | A1* | 9/2015 | Tatebe | G06F 3/06 707/613 |

FOREIGN PATENT DOCUMENTS

| | | |
|---|---|---|
| JP | 2010-146198 A | 7/2010 |
| JP | 2010-205159 A | 9/2010 |
| JP | 2012-226703 A | 11/2012 |

OTHER PUBLICATIONS

Dual y-axis Charts, 2012, IBM Knowledge Center, https://www.ibm.com/support/knowledgecenter/SSLVMB_21.0.0/com.ibm.spss.statistics.help/chart_creation_dauly.htm.*

\* cited by examiner

FIG. 3

Copy pair table — 200

| Pair ID | Primary storage ID | Secondary storage ID | Primary journal group ID | Secondary journal group ID | PVOL ID | SVOL ID |
|---|---|---|---|---|---|---|
| PA_1 | ST_A | ST_B | JN_1 | JN_1 | VOL_1 | VOL_5 |
| PA_2 | ST_A | ST_B | JN_1 | JN_1 | VOL_2 | VOL_6 |
| PA_3 | ST_A | ST_B | JN_2 | JN_2 | VOL_3 | VOL_7 |
| PA_4 | ST_A | ST_B | JN_2 | JN_2 | VOL_4 | VOL_8 |
| ... | ... | ... | ... | ... | ... | ... |

Configuration table — 220

| VOL ID | Storage ID | Host ID |
|---|---|---|
| VOL_1 | ST_A | Host_A |
| VOL_2 | ST_A | Host_B |
| VOL_3 | ST_A | Host_C |
| VOL_4 | ST_A | Host_A |
| VOL_5 | ST_B | Host_B |
| VOL_6 | ST_B | Host_D |
| VOL_7 | ST_B | Host_D |
| VOL_7 | ST_B | Host_A |
| VOL_8 | ST_B | Host_B |
| VOL_8 | ST_B | Host_C |
| ... | ... | ... |

VOL usage table (240)

| Time (241) | VOL ID (242) | Write quantity (MB/second) (243) | Number of writes (times/second) (244) |
|---|---|---|---|
| 8:00:00 | VOL_1 | 20 | 20 |
| 8:00:00 | VOL_2 | 20 | 20 |
| 8:00:00 | VOL_3 | 20 | 20 |
| 8:00:00 | VOL_4 | 20 | 20 |
| 8:00:01 | VOL_1 | 5 | 30 |
| 8:00:01 | VOL_2 | 30 | 10 |
| 8:00:01 | VOL_3 | 30 | 10 |
| 8:00:01 | VOL_4 | 30 | 10 |
| ... | ... | ... | ... |

FIG. 6

Delay table (260)

| Time (261) | Journal group ID (262) | Delay duration (seconds) (263) |
|---|---|---|
| 8:00:00 | JN_1 | 8 |
| 8:00:01 | JN_2 | 5 |
| 8:00:02 | JN_1 | 5 |
| 8:00:03 | JN_2 | 30 |
| ... | ... | ... |

FIG. 11

Journal group table — 300

| Journal group ID (301) | Storage ID (302) | Processor ID (303) |
|---|---|---|
| JN_1 | ST_A | PS_1A |
| JN_2 | ST_A | PS_1A |
| JN_1 | ST_B | PS_3B |
| JN_1 | ST_B | PS_4B |
| JN_2 | ST_B | PS_3B |
| JN_2 | ST_B | PS_4B |
| : | : | : |

FIG. 12

Processor usage table — 320

| Time (321) | Processor ID (322) | Operating rate (%) (323) |
|---|---|---|
| 8:00:00 | PS_1A | 30 |
| 8:00:00 | PS_2A | 20 |
| 8:00:00 | PS_3B | 10 |
| 8:00:00 | PS_4B | 10 |
| 8:00:01 | PS_1A | 80 |
| 8:00:01 | PS_2A | 30 |
| 8:00:01 | PS_3B | 20 |
| 8:00:01 | PS_4B | 20 |
| : | : | : |

FIG. 13

Graph characteristics classification table — 340

| Pattern ID — 341 | X-axis condition — 342 (tm: ymax time of time period T, tn: ymin time of time period T) | Y-axis condition — 343 (ya: start time of time period T, yb: end time of time period T) | | Graph characteristics — 344 |
|---|---|---|---|---|
| 1 | tm<tn | ya≧yb | ⌒ | Decrease after exceeding threshold |
| 2 | tm<tn | ya<yb | ∼ | First oscillation |
| 3 | tm>tn | ya≧yb | ∽ | Second oscillation |
| 4 | tm>tn | ya<yb | ╲ | Increase |
| 5 | tm=tn | ya=yb | │ | Fixed |

Comparative example

MANAGEMENT SYSTEM AND MANAGEMENT METHOD FOR COMPUTER SYSTEM COMPRISING REMOTE COPY SYSTEM FOR PERFORMING ASYNCHRONOUS REMOTE COPY

TECHNICAL FIELD

The present invention, in general, relates to the management of a computer system comprising a remote copy system for performing asynchronous remote copy.

BACKGROUND ART

An asynchronous remote copy system for copying data, which has been written to a primary volume of a primary storage system, to a secondary volume of a remotely located secondary storage system in an asynchronous manner with respect to the write to the primary volume is known. According to an asynchronous remote copy system, a plurality of data written to a primary volume is written to a secondary volume in the order in which the data was written to the primary volume.

In an asynchronous remote copy, there is a difference between the time that data was stored in the primary storage system and the time that the data was stored in the secondary storage system. Hereinafter, this difference will be referred to as the "delay duration". The delay duration may deteriorate, which means that remote copy reliability has declined. PTL 1 discloses a technology for monitoring the delay duration.

CITATION LIST

Patent Literature

[PTL 1]
Japanese Patent Application Publication No. 2010-146198

SUMMARY OF INVENTION

Technical Problem

In PTL 1, the fact that the delay duration has deteriorated can be determined, but it is not possible to find out the intrinsic cause of the delay deterioration (deterioration of the delay duration). When the intrinsic cause of delay deterioration can be determined, precise measures can be taken, and, in turn, remote copy reliability can be enhanced.

Solution to Problem

A management system has management information. The management information includes a plurality of delay durations respectively corresponding to a plurality of times, and a plurality of metric values respectively corresponding to a plurality of times with respect to a primary volume. The management system displays, based on the management information, a delay duration graph representing a fluctuation in delay duration associated with the passage of time, and an average-of-writing-quantity graph representing a fluctuation in average of writing quantity associated with the passage of time, in a mode that enables comparison between the two graphs. The average of writing quantity is an amount of data written to the primary volume per write request.

Advantageous Effects of Invention

The present invention makes it possible to infer the intrinsic cause of a delay deterioration in an asynchronous remote copy.

BRIEF DESCRIPTION OF DRAWINGS

FIG. 3 illustrates the configuration of a copy pair table.
FIG. 4 illustrates the configuration of a configuration table.
FIG. 5 illustrates the configuration of a VOL usage table.
FIG. 6 illustrates the configuration of a delay table.
FIG. 11 illustrates the configuration of a journal group table.
FIG. 12 illustrates the configuration of a processor usage table.
FIG. 13 illustrates the configuration of a graph characteristics classification table.

DESCRIPTION OF THE EMBODIMENTS

Figure 1:
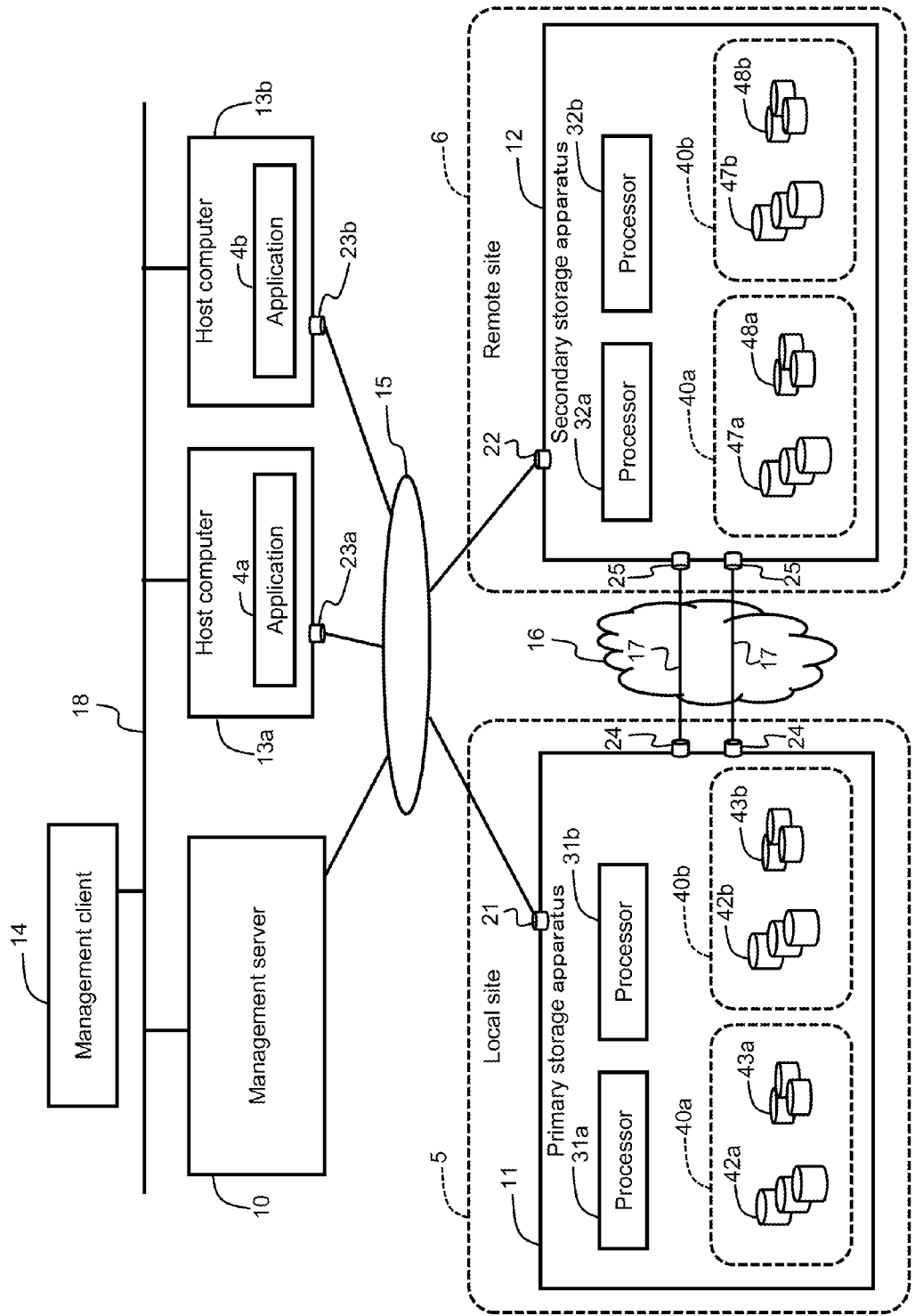
FIG. 1 illustrates the configuration of a storage system.

A number of examples will be explained below.

In the following explanation, information may be described using the expression "xxx table", but the information may also be expressed using any kind of data structure. In other words, to show that the information is not dependent on a data structure, "xxx table" can be called "xxx information".

Furthermore, in the following explanation, when giving a description that distinguishes between same type elements, reference numerals such as "host computer 13a" and "host computer 13b" may be used, and when giving a description that does not distinguish between same type elements, only the common number in the reference numeral, such as "host computer 13", may be used.

Also, in the following explanation, a primary storage system is a single primary storage apparatus, and a secondary storage system is a single secondary storage apparatus, but the primary storage system may comprise a plurality of primary storage apparatuses, and the secondary storage system may comprise a plurality of secondary storage apparatuses.

In the following explanation, identification (ID) is used to identify an element (for example, a storage apparatus, a host computer, a pair, and so forth), but the ID can comprise at least one of a number and a letter.

Also, in the following explanation, time (for example, either a time, or a start time and an end time of a time duration) is expressed in units of hours, minutes, and seconds, but time may be expressed using either coarser or finer units.

Also, in the following explanation, there may be cases where processing is described having "program" as the subject of the sentence, but since the stipulated processing is performed in accordance with a program being executed by a processor (for example, a central processing unit (CPU) while using at least one of a storage resource (for example, a memory) and a communication interface device as needed, the doer of the processing may be the processor or the apparatus comprising this processor. The processor may comprise a hardware circuit that carries out a part of the processing. A computer program may be installed from a program source. The program source may be either a program delivery server or a storage medium (for example, a portable storage medium).

In the following explanation, an aggregation of one or more computers for managing at least one node (for example, at least one of a host computer and a storage apparatus) included in a computer system may be called a "management system". In a case where a management computer displays information for display, the management computer may be the management system. Furthermore, a combination of a management computer and a display computer may be the management system. Also, the same processing as that performed by the management computer may be realized using a plurality of computers to increase the speed and reliability of management processing, in which case, this plurality of computers (may include a display computer when the display computer performs displays) may be the management system. In this example, the management system comprises a management server 10 and a management client 14. Furthermore, the displaying of information by the management computer may involve the display of information on a display device of the management computer, but in the following examples, the management server 10 sends display information to the management client 14, which is an example of a display computer. In accordance with this, information representing the display information is displayed by the management client 14 on a display device (not shown in the drawings) of the management client 14.

Furthermore, in the following explanation, the management server 10 collects information from a computer system node (for example, at least one of the host computer and the storage apparatus), but the collected information may be information obtained from the node in response to a query (request) from the management server 10, or may be information spontaneously sent from the node without such a query.

In the following explanation, "VOL" is the abbreviation for a volume (logical volume), and refers to a logical storage device. A VOL may be a real VOL (RVOL) or a virtual VOL (VVOL). A VOL may also be an online VOL that is provided to a host computer connected to the storage apparatus that provides this VOL, or may be an offline VOL that is not provided to the host computer (is not recognized by the host computer). The "RVOL" is a VOL based on a physical storage resource of the storage apparatus that comprises this RVOL (for example, a redundant array of independent (or inexpensive) disks (RAID) group comprising a plurality of PDEVs). The "VVOL", for example, may be an externally connected VOL (EVOL), which is based on a storage resource (for example, a VOL) of an external storage apparatus that is connected to the storage apparatus having this VVOL, and is a VOL that conforms to a storage virtualization technology; a VOL (TPVOL) that comprises a plurality of virtual pages (virtual storage areas) and conforms to a capacity virtualization technology (typically thin provisioning); or a snapshot VOL that is provided as a snapshot of an original VOL. A TPVOL is typically an online VOL. A snapshot VOL may be an RVOL. "PDEV" is the abbreviation for a nonvolatile physical storage device. A plurality of RAID groups may be configured from a plurality of PDEVs. A RAID group may also be called a parity group. A "pool" is a logical storage area (for example, an aggregation of a plurality of pool VOLs), and may be prepared for different purposes. For example, a pool may be a TP pool or a snapshot pool. A TP pool is a storage area comprising a plurality of real pages (real storage areas). A real page may be allocated from a TP pool to a virtual page of a TPVOL. A snapshot pool may be a storage area where data saved from an original VOL is stored. A "pool VOL" is a VOL that is a component of a pool. A pool VOL may be an RVOL or an EVOL. A pool VOL is typically an offline VOL.

In the following explanation, a "metric" is a type of repetitive acquisition, calculated performance, or usage status, and a "metric value" is a value that expresses this performance or usage status. For example, in terms of a VOL, any of the write quantity, number of writes, and average of writing quantity described below is a example of a metric, and any of a write quantity "20" (MB/second), the number of writes "20" (times/second), and an average of writing quantity "10" (MB/write) is an example of a metric value. Also, for example, when it comes to the processor, the operating rate is an example of a metric, and operating rate "30" (%) is an example of a metric value.

Example 1

FIG. 1 illustrates the configuration of a computer system.

The computer system comprises a remote copy system, a management server 10, a management client 14, and host computers 13a, 13b. The remote copy system comprises a primary storage apparatus 11 at a local site 5, and a secondary storage apparatus 12 at a remote site 6. The apparatuses 10, 11, 12, 13a and 13b are able to send and receive data via a communication network (for example, a storage area network (SAN)) 15. The management server 10 can send and receive data to and from the management client 14 and the host computers 13a, 13b via a communication network (for example, local area network (LAN)) 18. The primary storage apparatus 11 and the secondary storage apparatus 12 are also connected to the communication network 18, and the management server 10 may collect information from the primary storage apparatus 11 and the secondary storage apparatus 12 via the communication network 18.

The primary storage apparatus 11 comprises processors 31a, 31b, a cache memory or other such memory (not shown in the drawing), a plurality of PDEVs (not shown in the drawing), and communication ports 21 and 24. There may be one or a plurality of each of these devices. The memory, for example, comprises either a dynamic random access memory (DRAM) or a ferroelectric random access memory (FeRAM). The PDEV, for example, comprises either a hard disk drive (HDD) or a solid state drive (SSD). The communication port 21, for example, comprises a fibre channel adapter or the like. The communication port 24, for example, comprises an Ethernet (registered trademark) adapter or the like. The primary storage apparatus 11 provides a plurality of VOLs. The VOLs include a primary VOL (PVOL) 42, and a primary journal VOL (PJVOL) 43. The PVOL is one type of online VOL, and is a VOL to which data is written from the host computer 13 (hereinafter, data accessible to the host computer 13 may be referred to as "user data"). The PJVOL is an example of a primary journal storage area, is one type of offline VOL, and is the VOL to which a journal of user data written to the PVOL is written. The journal may include user data written to the PVOL (more accurately, a replication of the user data), and metadata related to the user data. The metadata includes information on the write destination of corresponding user data (for example, the ID of the write-destination PVOL, and the address of the write-destination area in the write-destination PVOL), and sequence information that defines the sequence via which the corresponding user data was written to the PVOL (for example, a sequence number or a timestamp).

The secondary storage apparatus 12 comprises processors 32a, 32b, a cache memory or other such memory (not shown in the drawing), a plurality of PDEVs (not shown in the drawing), and communication ports 22 and 25. The explanations for these respective devices are the same as for those of the primary storage apparatus 11. For example, the communication port 22 is the same type as the communication port 21, and the communication port 25 is the same type as the communication port 24. The secondary storage apparatus 12 also provides a plurality of VOLs. The VOLs include a secondary VOL (SVOL) 47, and a secondary journal VOL (SJVOL) 48. The SVOL 47 is a VOL configuring a pair with the PVOL, and is the copy-destination VOL for user data that has been written to the PVOL. The SJVOL 48 is an example of a secondary journal storage area, and is the copy-destination VOL for a journal that has been written to the PJVOL 43. The user data included in a journal stored in the SJVOL 48 is written to the SVOL on the basis of the metadata inside the journal.

There is a plurality (or one) journal group 40a, 40b in the remote copy system. One or more PVOLs 42, one or more PJVOLs 43, one or more SJVOLs 48, and one or more SVOLs 47 are associated with each journal group 40. Each PVOL 42, PJVOL 43, SJVOL 48 and SVOL 47 is associated with one journal group 40, and is not associated with a plurality of different journal groups 40. The PVOL 42 may be the same for a plurality of pairs. The journal group 40a comprises the PVOL 42a, the PJVOL 43a, the SJVOL 48a, and the SVOL 47a, and the journal group 40b comprises the PVOL 42b, the PJVOL 43b, the SJVOL 48b, and the SVOL 47b. The primary storage apparatus 11 and the secondary storage apparatus 12 carry out an asynchronous remote copy via a remote path 17 configured on the communication network 16. An asynchronous remote copy is performed for each journal group. An asynchronous remote copy is a technology for copying data that has been written to the PVOL 42a to the SVOL 47 via the remote path 17 in an asynchronous manner with respect to the data write to the PVOL 42. Specifically, for example, using the journal group 40a as an example, an asynchronous remote copy is performed as follows. That is, the primary storage apparatus 11 receives a write request specifying the PVOL 42a from the host computer 13, writes user data conforming to the received write request to the cache memory, creates a journal containing the user data on the cache memory, and writes the created journal to the PJVOL 43a. The primary storage apparatus 11, in response to the write request, replies to the host computer 13 that the write is complete regardless of whether or not the journal has been transferred to the secondary storage apparatus 12. The primary storage apparatus 11, either spontaneously or in response to a request from the secondary storage apparatus 12, transfers the journal inside the PJVOL 43a to the secondary storage apparatus 12. The secondary storage apparatus 12 receives the transferred journal, writes the received journal to the cache memory, and writes the journal on the cache memory to the SJVOL 48a. Thereafter, the secondary storage apparatus 12 writes the user data inside the journal stored in the SJVOL 48a to the SVOL 47a on the basis of the metadata inside the journal. Thus, the user data written to the PVOL 42a is copied to the SVOL 47a that is paired with this PVOL 42a.

The host computer 13 comprises a storage resource (for example, a memory) (not shown in the drawing), a communication port 23, and a processor (not shown in the drawing). The processor inside the host computer 13 executes either one or a plurality of application programs 4. The host computer 13a (13b), in accordance with executing the application program 4a (4b), sends an access request to the primary storage apparatus 11 specifying the PVOL 42. The access request is either a write request or a read request. That is, the host computer 13 either writes data to the PVOL 42, or reads data from the PVOL 42. When it is not possible to access the PVOL 42, the host computer 13 can continue the process by switching the access destination to the SVOL 47.

In an asynchronous remote copy, the time at which data is stored in the primary storage apparatus 11 will differ from the time at which the data is stored in the secondary storage apparatus 12. This difference is called the "delay duration". In this example, the delay duration is the difference between the time at which a journal is stored in the PJVOL 43 of the primary storage apparatus 11 and the time at which this journal is stored in the SJVOL 48 of the secondary storage apparatus 12. The delay duration, for example, is calculated for each journal group. The delay duration start time may be either the time at which the data is stored in the PVOL 42, or the time at which the journal containing this data is stored in the PJVOL 43, and the delay duration end time may be either the time at which the data is stored in the SVOL 47, or the time at which the journal containing this data is stored in the SJVOL 48.

The delay duration may deteriorate. Delay duration deterioration refers to the fact that the delay duration exceeds a threshold (for example, the fact that the delay duration exceeds a threshold of either equal to or greater than a predetermined time, or equal to or greater than a predetermined number of times). The delay duration threshold may differ for each journal group 40, or may be common to a plurality of journal groups 40. The cause of delay deterioration (delay duration deterioration) is considered to be the fact that the asynchronous remote copy-related resource (for example, either the processor 31 or the communication port 21) of the resources (physical resources) comprising the primary storage apparatus 11 became overloaded prior to the time of the delay deterioration. One cause of a resource becoming overloaded is considered to be the host computer 13 having issued large amounts of write requests specifying the PVOL 42.

However, the intrinsic cause of delay deterioration is not a large amount of write requests specifying the PVOL 42 having been issued by the host computer 13, but rather it is the cause of the write requests having been issued in large quantities, that is, the cause of the increase in write requests. The cause for an increase in write requests could be an increase in throughput (volume of work) in the host computer 13, but this is not always the cause of work request increases. Another cause could be changes in the processing mode (operation mode) in the host computer 13. For example, when the mode of operation that uses a certain PVOL 42 changes from a batch operation made up primarily of sequential writes to a different operation made up primarily of random accesses, the number of write requests will increase even if the throughput of the host computer 13 remains the same.

Consequently, in the first example, the management server 10 displays on the management client 14 information by which the administrator can infer whether the intrinsic cause of the delay deterioration is an increase in the throughput (volume of work) of the host computer 13, or a change in the processing mode (operation mode) in the host computer 13. The management system configured by the management server 10 and the management client 14 is a client-server system, and the management client 14, by executing a Web browser (not shown in the drawing), can communicate with the management server 10 and use the Web browser to display information for display from the management server 10. The management client 14 is a so-called input/output console, and comprises input devices (for example, a keyboard and a pointing device) and a display device.

The first example will be explained in more detail below.

Figure 2:
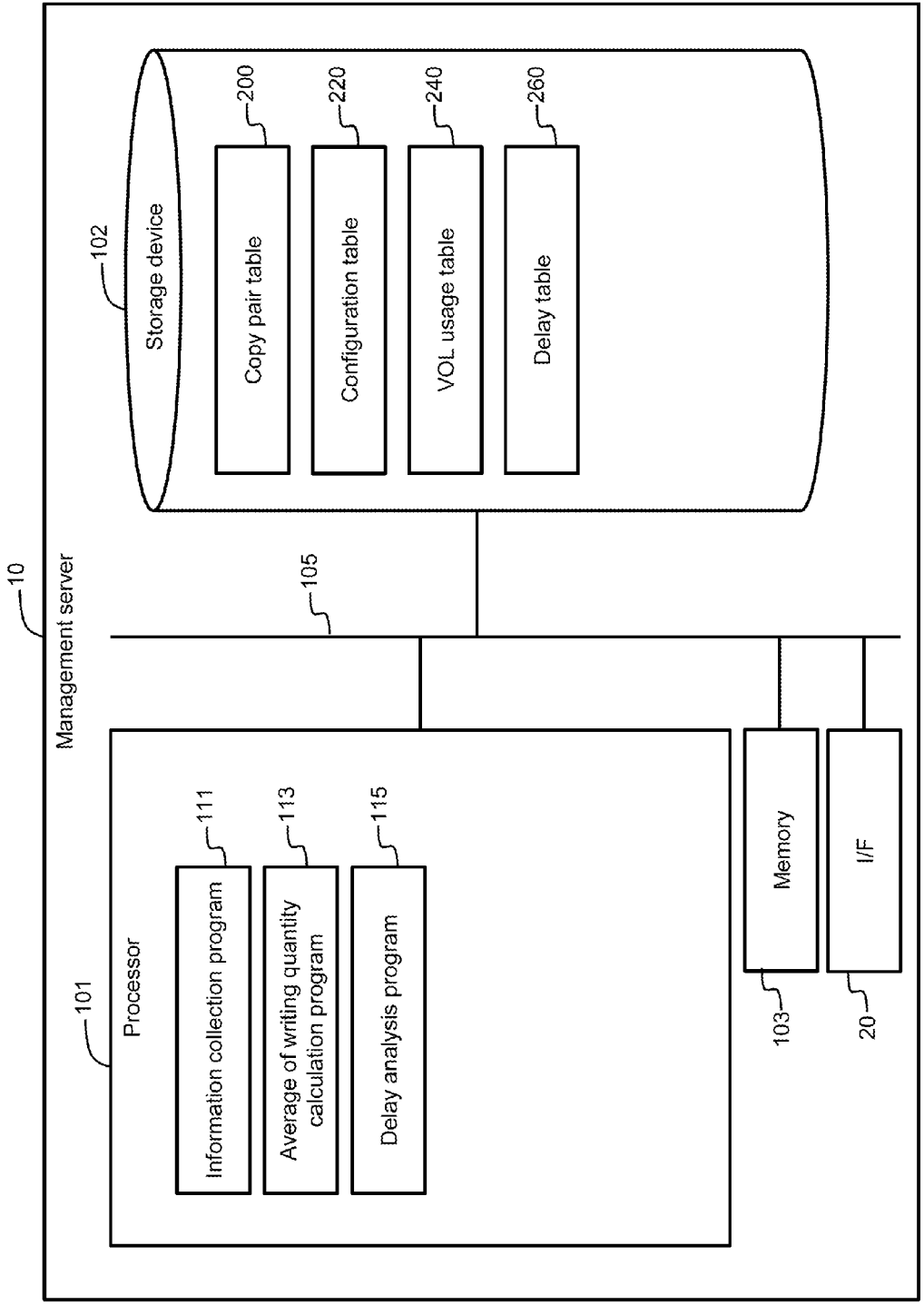
FIG. 2 illustrates the functions and information of a management server related to a first example.

FIG. 2 illustrates the functions and information of the management server 10 related to the first example.

The management server 10 comprises a processor 101, a storage resource (for example, a storage device 102 and a memory 103), an I/F (communication interface) 20, and an internal bus 105 for connecting these devices 101, 102, 103, and 20. The processor 101 realizes the various functions of the management server 10 by executing programs. The memory 103 holds the programs executed by the processor 101 and the data accessed by the processor 101, and, for example, comprises a DRAM or the like. The storage device 102 is an auxiliary storage device, can store either the programs or data loaded into the memory 103, and, for example, comprises either an HDD or a SSD. The I/F 20 is one or more communication interfaces, and, for example, includes a communication interface device (for example, a fibre channel adaptor) for connecting the management server 10 to the communication network (for example, a SAN) 15, and a communication interface device (for example, a LAN controller (LANC)) for connecting the management server 10 to the communication network (for example, LAN) 18. The internal bus 105 is a channel that enables the two-way transmission of data, and, for example, comprises a PCI-Express bus or the like.

Information stored by the storage device 102, for example, includes a copy pair table 200, a configuration table 220, a VOL usage table 240, and a delay table 260. These tables are examples of management information, and at least a portion of these tables may be loaded into the memory 103. In addition, the computer programs that are stored in the memory 103 and executed by the processor 101, for example, include an information collection program 111 for collecting information from a node inside the computer system (at least one of the storage device and the host computer), an average of writing quantity calculation program 113 for calculating an average of writing quantity based on information that has been collected, and a delay analysis program 115 for creating and displaying a graph representing time-series variations in calculated average of writing quantities.

FIG. 3 illustrates the configuration of a copy pair table 200.

The copy pair table 200 comprises a record for each copy pair (pair of VOLs for a remote copy), and each record comprises the fields of pair ID 201, primary storage ID 202, secondary storage ID 203, primary journal group ID 204, secondary journal group ID 205, PVOL ID 206, and SVOL ID 207.

The ID of a copy pair is registered in the pair ID 201. In the primary storage ID 202 and the secondary storage ID 203, respectively, there is registered the ID of the primary storage apparatus 11 and the ID of the secondary storage apparatus 12. A journal group 40 ID is registered in each of the primary journal group ID 204 and the secondary journal group ID 205. Furthermore, since a journal group 40 spans the primary storage apparatus 11 and the secondary storage apparatus 12, the IDs registered in each of the primary journal group ID 204 and the secondary journal group ID 205 may be the same, and the fields therefor may be one common field. The ID of the PVOL 42 and the ID of the SVOL 47 are respectively registered in the PVOL ID 206 and the SVOL ID 207. According to the copy pair table 200 illustrated in FIG. 3, two copy pairs "PA_1" and "PA_2" are included in the journal group "JN_1".

FIG. 4 illustrates the configuration of a configuration table 220.

The configuration table 220 comprises a record for each VOL and host computer set. Each record comprises the fields of VOL ID 221, storage ID 222, and host ID 223.

The ID of either VOL 42 or 47 is registered in the VOL ID 221. The ID of either storage apparatus 11 or 12 comprising either VOL 42 or 47 is registered in the storage ID 222. The ID of the host computer 13 that uses either VOL 42 or 47 is registered in the host ID 223. According to the configuration table 220 illustrated in FIG. 4, the VOL "VOL_1" is used by the one host computer "Host_A", and the VOL "VOL_7" is used by the two host computers "Host_D" and "Host_A".

FIG. 5 illustrates the configuration of a VOL usage table 240.

The VOL usage table 240 comprises a record for each VOL usage history. Each record comprises the fields of time 241, VOL ID 242, write quantity 243, and number of writes 244.

Information representing a time (for example, a start time for a metric value collection cycle) is registered in the time 241. The ID of either VOL 42 or 47 is registered in the VOL ID 242. A write quantity, which is an example of a metric value, is registered in the write quantity 243. The "write quantity" is the amount of data that has been written to either VOL 42 or 47 per unit of time, in other words, the amount of write data that has been sent from the host computer 13 to either VOL 42 or 47 per unit of time. The number of writes, which is an example of a metric value, is registered in the number of writes 244. The "number of writes" is the number of write requests specifying either VOL 42 or 47 received per unit of time, in other words, the number of write requests specifying either VOL 42 or 47 that has been sent from the host computer 13 per unit of time. The write quantity and number of writes respectively registered in fields 243 and 244 may be identified from information collected from the storage apparatuses 11 and 12, or may be identified from information collected from the host computers 13a and 13b.

FIG. 6 illustrates the configuration of a delay table 260.

The delay table 260 comprises a record for each time and set of journal groups. Each record comprises the fields of time 261, journal group ID 262, and delay duration 263.

Information representing a time (for example, a start time for a metric value collection cycle) is registered in the time 261. The ID of a journal group 40 is registered in the journal group ID 262. Information representing a delay duration (for example, "seconds"), which is an example of a metric value, is registered in the delay duration 263. According to the delay table 260 illustrated in FIG. 6, it is clear that eight seconds after a journal was stored at "8:00:00" in PJVOL 43 of the journal group "JN_1", this journal was stored (copied) to SJVOL 48.

The information collection program 111 collects various predetermined types of information from the host computer 13 and the storage apparatuses 11 and 12, respectively, during a predetermined cycle, and registers the collected information in tables 200, 220, 240, and 260. For example, the information collection program 111 identifies the write quantity "20" (MB/second) and number of writes "20" (times/second) corresponding to "8:00:00" from information acquired with respect to the VOL "VOL_1" from the storage apparatus 11 and the host computer "Host_A", and registers the identified write quantity and number of writes in the VOL usage table 240 (refer to FIG. 5). Furthermore, for example, regarding the journal group "JN_1", the information collection program 111 acquires from the primary storage apparatus 11 and the secondary storage apparatus 12 the time "8:00:00" at which a journal was written to the PJVOL 43 and the time "8:00:08" at which the same journal was written to the SJVOL 48, and registers "8 seconds", which is the difference therebetween, in the delay table 260 (refer to FIG. 6).

The average of writing quantity calculation program 113 is for calculating an average of writing quantity. The "average of writing quantity" is the average amount of data written per write request, and more specifically, average of writing quantity=write quantity/number of writes. When the host computer 13 performs more sequential writes than random writes, the number of writes is small but the write quantity is large. Therefore, the average of writing quantity is relatively large. By contrast, when the host computer 13 performs more random writes than sequential writes, the number of writes increases, and the write quantity also increases. Therefore, the average of writing quantity is relatively small, and does not change much (the average of writing quantity is small and does not change much at least compared to when sequential writes are relatively numerous).

The delay analysis program 115 issues a notification to the administrator (management client 14) when a delay deterioration has been detected for any journal group 40. The notification, for example, may include at least one of the ID of the journal group for which the delay deterioration was detected (hereinafter, delay-deteriorated journal group) 40, the delay deterioration time (time when the delay duration exceeded a threshold), and the ID of the host computer 13 that uses the PVOL belonging to the delay-deteriorated journal group 40.

The delay analysis program 115 also creates a graph on the basis of tables 200, 220, 240, and 260. Specifically, for example, the delay analysis program 115, on the basis of the VOL usage table 240, creates for each VOL a write quantity graph, which is a graph representing a fluctuation in the write quantity associated with the passage of time. Also, for example, the delay analysis program 115, on the basis of the VOL usage table 240, creates for each VOL a number-of-writes graph, which is a graph representing a fluctuation in the number of writes associated with the passage of time. Also, for example, the delay analysis program 115, on the basis of the delay table 260, creates for each journal group 40 a delay duration graph, which is a graph representing a fluctuation in the delay duration associated with the passage of time. The delay analysis program 115, on the basis of the average of writing quantity calculated by the average of writing quantity calculation program 113, creates for each VOL an average-of-writing-quantity graph, which is a graph representing a fluctuation in the average of writing quantity associated with the passage of time.

In addition, the delay analysis program 115 displays in a mode that enables comparison between a delay duration graph for a delay-deteriorated journal group 40 and an average-of-writing-quantity graph for a PVOL belonging to this journal group 40. Displaying in a mode that enables comparison may refer to aligning the graph screen on which the delay duration graph is displayed alongside the graph screen on which the average-of-writing-quantity graph is displayed, but in this example, these graphs are displayed on the same graph screen. The time period that corresponds to the graph targeted for display is, for example, a time period of a predetermined width based on the delay deterioration time.

Figure 7:
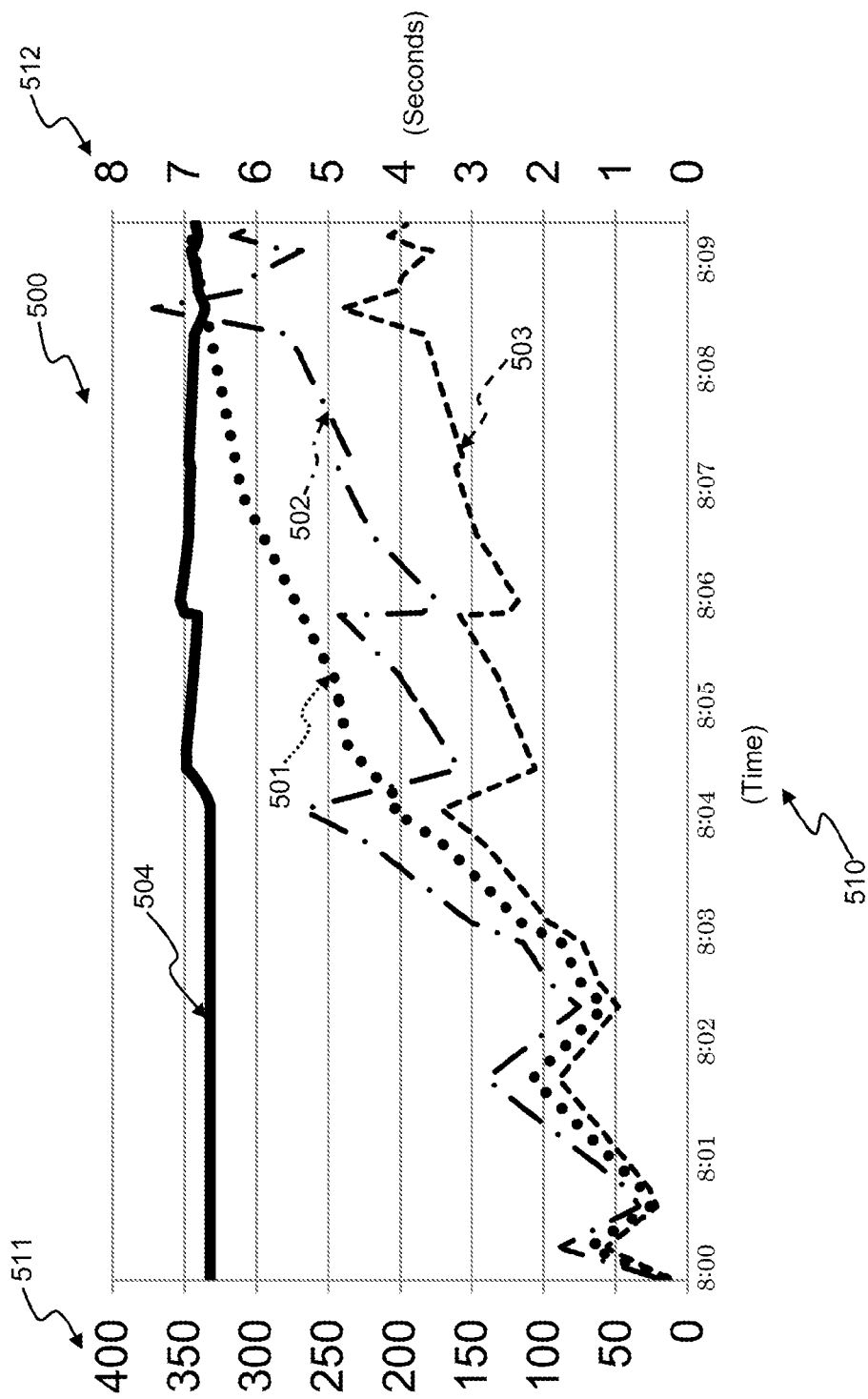
FIG. 7 illustrates an example of a graph screen related to the first example.
Figure 8:
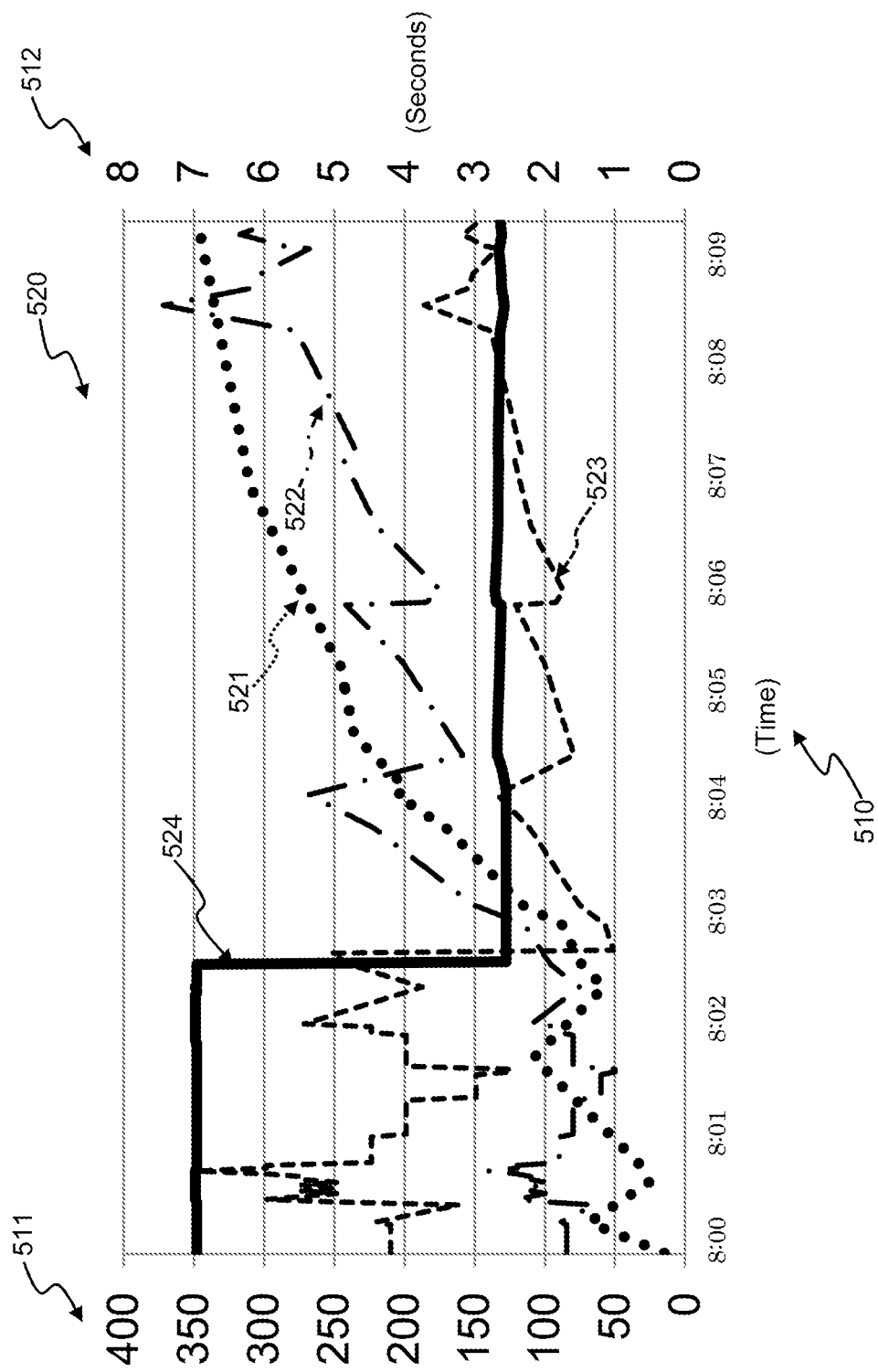
FIG. 8 illustrates another example of a graph screen related to the first example.

FIGS. 7 and 8 both illustrate examples of graph screens.

In the graph screen 500 of FIG. 7 and the graph screen 520 of FIG. 8, the X axis (horizontal axis) 510, which is an example of a first axis, represents time (it is the time axis), a right-side Y axis 512, which is an example of a second axis, represents the delay duration, and a left-side Y axis (vertical axis) 511, which is an example of a third axis, represents an index pertaining to write quantity and number of writes. For example, the graph screen 500 of FIG. 7 is the screen for one of the PVOLs 42a in a journal group 40a, and the graph screen 520 of FIG. 8 is the screen for one of the PVOLs 42b in another journal group 40b.

First, refer to the graph screen 500 of FIG. 7.

When the administrator looks at the delay duration graph 501, he learns that the delay duration began to increase at around 8:02:30. Also, when the administrator looks at the write quantity graph 502 and the number-of-writes graph 503, he learns that the write quantity and the number of writes also began to increase at around the same time of 8:02:30.

However, based on the write quantity graph 502 and the number-of-writes graph 503 alone, the administrator does not know whether the intrinsic cause of the increase in the delay duration is an increase in the throughput of the host computer 13, or a change in the processing mode of the host computer 13.

When the administrator looks at the average-of-writing-quantity graph 504 at this point, he learns that the average of writing quantity did not fluctuate much at all after 8:02:30. This enables the administrator to infer that the intrinsic cause of the increase in the delay duration in the journal group 40a was an increase in the throughput of the host computer 13. This is because it is possible to infer that the lack of much change in the average of writing quantity was due to an increase in random-write write requests, and that the processing load on the processor 31 in the primary storage apparatus 11 increased, resulting in the increase in the delay duration.

Next, refer to graph screen 520 of FIG. 8.

When the administrator looks at the delay duration graph 521, he learns that the delay duration began to increase at around 8:02:30 similar to the delay duration graph 501 of FIG. 7.

However, when the administrator looks at the average-of-writing-quantity graph 524, he learns that, unlike the average-of-writing-quantity graph 504 of FIG. 7, the average of writing quantity suddenly decreased at around 8:02:30. This enables the administrator to infer that the intrinsic cause of the increase in the delay duration in the journal group 40b was a change in the processing mode in the host computer 13. That is, the administrator is able to infer that the processing mode of the host computer 13 changed from a primarily sequential write processing mode to a primarily random write processing mode. This is because it is possible to infer that the sudden drop in the average of writing quantity was due to the processing mode being changed from a primarily sequential write mode to a primarily random write mode, and that the processing load on the processor 31 in the primary storage apparatus 11 increased, which increased the delay duration.

As described above, since the average-of-writing-quantity graph is displayed together with the delay duration graph (for example, on the same coordinates), the administrator is able to readily determined whether the cause of the delay deterioration was an increase in the throughput of the host computer 13, or a change in the processing mode of the host computer 13.

Figure 9:
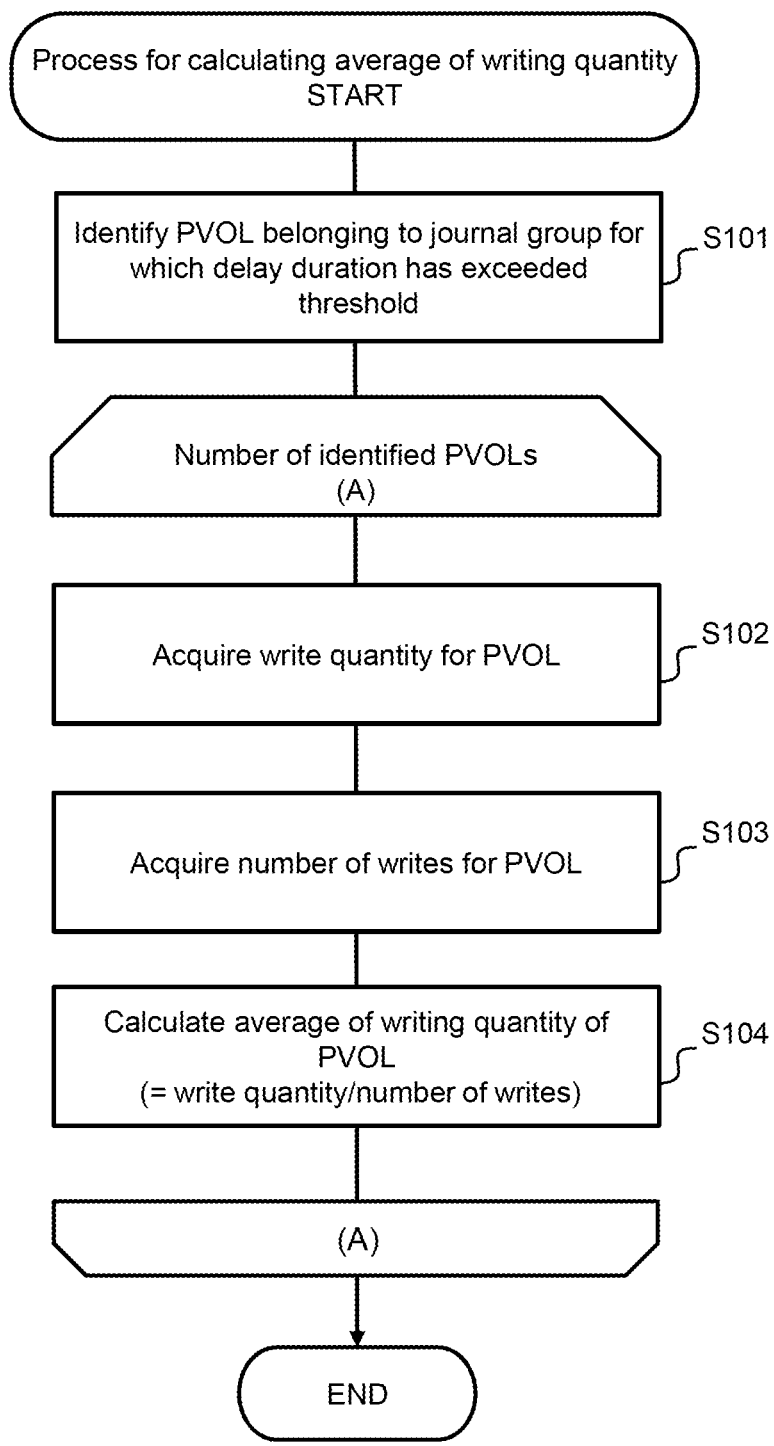
FIG. 9 is a flowchart of processing for calculating an average of writing quantity.

FIG. 9 is a flowchart of the processing for calculating an average of writing quantity.

The information collection program 111 identifies all the PVOLs 42 that belong to the journal group 40 for which the delay duration exceeded the threshold (S101). The average of writing quantity calculation program 113 performs S102 through S104 for each of the PVOLs 42 identified in S101. S102 through S104 will be explained using one of the identified PVOLs ("target PVOL" in the explanation of FIG. 9 hereinbelow) as an example.

The average of writing quantity calculation program 113 acquires the write quantity and the number of writes corresponding to the target PVOL 42 from the VOL usage table 240 (S102 and S103). At this time, the average of writing quantity calculation program 113 acquires the write quantity and the number of writes at each time belonging to a time period of a predetermined width based on the delay deterioration time. The "time period of a predetermined width based on the delay deterioration time" may include the delay deterioration time and a time period further in the future, but at the least includes a time period of a predetermined width in the past from the delay deterioration time. This is because the status during the time period of a predetermined width in the past from the delay deterioration time is the cause of the delay deterioration.

The average of writing quantity calculation program 113 calculates the average of writing quantity using the acquired write quantity and number of writes for each time belonging to the time period of a predetermined width based on the delay deterioration time (S104).

According to the above processing, the write quantity, number of writes, and average of writing quantity at each time belonging to the time period of a predetermined width based on the delay deterioration time are acquired for each PVOL 42 belonging to the delay-deteriorated journal group 40. The delay analysis program 115, based on the write quantity, number of writes, and average of writing quantity at each time belonging to the time period of a predetermined width based on the delay deterioration time, creates the graphs illustrated in FIGS. 7 and 8 for each PVOL 42 belonging to the delay-deteriorated journal group 40, and the delay analysis program 115 displays the created graphs on the same graph screen.

According to the first example, the management server 10 displays, with respect to the delay-deteriorated journal group 40, an average-of-writing-quantity graph for a PVOL belonging to this journal group 40 in a mode that enables comparison with a delay duration graph. This enables the administrator to infer whether the intrinsic cause of the delay deterioration is an increase in the throughput (volume of work) of the host computer 13, or a change in the processing mode (operation mode) of the host computer 13. Furthermore, in the first example, the management server 10 compares the delay duration graph to the average-of-writing-quantity graph, and based on the results of the comparison, may infer the intrinsic cause of the delay deterioration and output the inferred cause. The host computer that is using a PVOL can be gleaned from the configuration table 220 using the ID of the PVOL as a key, and as such, the administrator is able to ask the host computer user to take predetermined measures.

Example 2

A second example will be explained. Explanations of points shared in common with the first example will either be shortened or omitted, and the explanation will focus primarily on the points of difference with the first example.

In an asynchronous remote copy, the time period from when the number of PVOL writes increases until the delay duration deteriorates will differ depending on the relationship between the number of writes, the write quantity, and the physical resources of the primary storage apparatus 11 (for example, at least one of the port, the processor, and the cache memory). By comparing the delay duration graph to a metric value graph (for example, at least one of the write quantity graph, the number-of-writes graph, and the average-of-writing-quantity graph) for each PVOL belonging to the journal group 40 for which a delay deterioration has been detected, the administrator is able to find the PVOL presumed to be the cause of the delay deterioration.

However, when there is a large number of PVOLs in the delay-deteriorated journal group 40, comparing the graphs is a major burden for the administrator.

Also, when delay deterioration has been detected for a plurality of journal groups, and the above-described graph comparisons must be performed for each PVOL for each of the plurality of journal groups, the burden on the administrator is great. Specifically, for example, there may be cases where the cause of delay deterioration was an increase in the number of writes with respect to a certain PVOL in a certain journal group, and the physical resource (shared resource) related not only to this PVOL but also to another PVOL in another journal group becomes overloaded prior to the delay deterioration time, and when this happens, the delay duration may deteriorate for the other journal group to which this shared resource is related. In a case like this, finding the PVOL that is presumed to be the cause of the delay deterioration is a burden for the administrator.

Consequently, in the second example, the management server 10 determines whether or not the relationship between metric value fluctuation (for example, a metric value graph) for each PVOL belonging to a PVOL search range and a delay duration fluctuation (for example, a delay duration graph) for a delay-deteriorated journal group 40 meet a predetermined condition. The PVOL search range is one or more PVOLs corresponding to a metric value fluctuation that is compared to each delay duration fluctuation of the delay-deteriorated journal group 40, and, for example, is one or more PVOLs belonging to the delay-deteriorated journal group 40. The metric value graphs to be displayed are narrowed down to metric value graphs in which the determination results are affirmative. This enhances the readability of the graphs, thereby making it easy for the administrator to find the PVOL that can be presumed to be the cause of the delay deterioration. The host computer that is using this PVOL can be gleaned from the configuration table 220 using the IDs of the PVOLs as a key, thereby making it possible for the host computer that is the cause of the delay deterioration to be inferred.

In the second example, it is also possible to adjust the aforementioned PVOL search range that corresponds to the existence of an overloaded shared resource associated with a delay-deteriorated journal group 40. The "shared resource" is a physical resource (especially a physical resource of the primary storage apparatus 11) that is associated with two or more journal groups 40. Physical resource "overload" is when a metric value of the physical resource exceeds a threshold. The "overloaded shared resource associated with a delay-deteriorated journal group 40" is a shared resource, which is associated with a delay-deteriorated journal group 40, and which became overloaded in a time period of predetermined width in the past from the delay deterioration time. In the second example, when there is no overloaded shared resource associated with a delay-deteriorated journal group 40, the PVOL search range is all of the PVOLs belonging to the delay-deteriorated journal group 40, and, conversely, when there is an overloaded shared resource associated with a delay-deteriorated journal group 40, the PVOL search range is all the PVOLs belonging to all the other journal groups 40 with which this shared resource is associated in addition to all the PVOLs belonging to the delay-deteriorated journal group 40. In so doing, the size of the PVOL search range can be optimized.

The second example will be explained in detail below.

Figure 10:
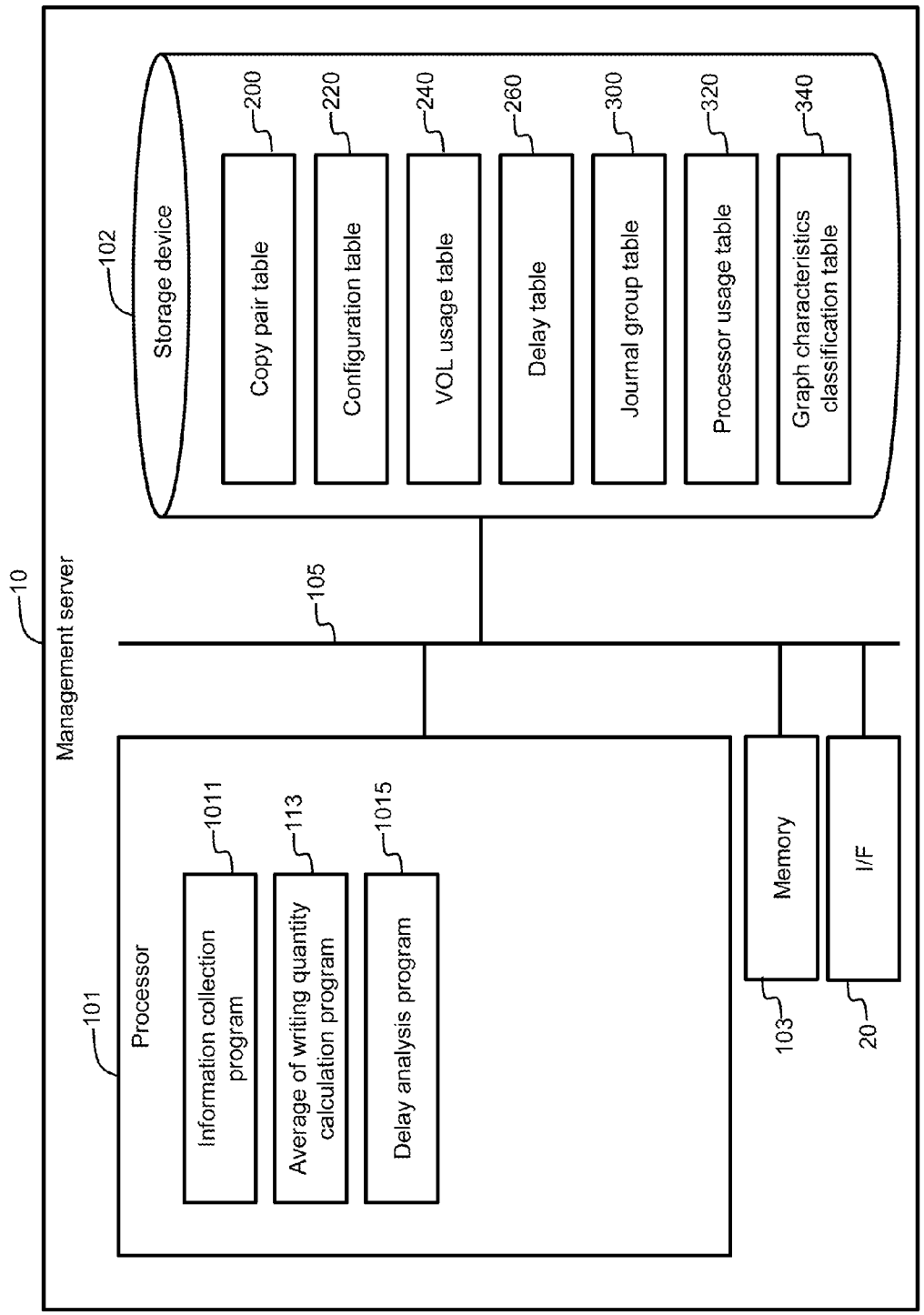
FIG. 10 illustrates the functions and information of a management server related to a second example.

FIG. 10 illustrates the functions and information of the management server 10 related to the second example.

The storage device 102 stores a journal group table 300, a graph characteristics classification table 340, and a processor usage table 320 in addition to the tables 200, 220, 240, and 260 described hereinabove. In addition, the processor 101 executes an information collection program 1011 that collects more information than the information collection program 111 of the first example, and a delay analysis program 1015 that has more functions than the delay analysis program 115 of the first example.

FIG. 11 illustrates the configuration of the journal group table 300.

The journal group table 300 comprises a record for each journal group 40 and processor set. Each record comprises the fields of journal group ID 301, storage ID 302, and processor ID 303.

The ID of a journal group 40 is registered in the journal group ID 301. The ID of either storage apparatus 11 or 12 is registered in the storage ID 302. The ID of either processor 31 or 32 is registered in the processor ID 303. According to the journal group table 300 illustrated in FIG. 11, the processor "PS_1A" of the primary storage apparatus "ST_A" is associated with the plurality of journal groups "JN_1" and "JN_2". That is, the processor "PS_1A" processes write requests for PVOLs in journal group "JN_1" and "JN_2".

FIG. 12 illustrates the configuration of the processor usage table 320.

The processor usage table 320 comprises a record for each usage history of either processor 31 or 32. Each record comprises the fields of time 321, processor ID 322, and operating rate 323.

Information representing a time is registered in the time 321. The ID of either processor 31 or 32 is registered in the processor ID 322. The operating rate (%) of either processor 31 or 32 is registered in the operating rate 323. The registered operating rate is the operating rate collected from the storage apparatuses 11 and 12 by the information collection program 111. A processor for which the operating rate exceeds a threshold is an overloaded processor.

In this example, the processor 31 is given as an example of a physical resource (a physical resource inside the primary storage apparatus 11) associated with a journal group 40. Thus, in the journal group table 300 of FIG. 11, the only physical resource associated with the journal group 40 is the processor. Another type of physical resource may be employed as the physical resource associated with the journal group 40. For example, the port 21 connected to the host computer 13 may be employed as the physical resource. In this case, the ID of the port 21 may be associated with each journal group 40 in the journal group table 300, and the metric value of the port 21 (for example, the amount of data transferred per unit of time) may be collected at a predetermined cycle, and may be registered in a predetermined table. A write request is received via the port 21 associated with the journal group 40 to which the PVOL 42 specified in the write request belongs. A port 21 for which the metric value exceeds a threshold is an overloaded port 21. Also, for example, the cache memory (not shown in the drawing) may be employed as the physical resource associated with a journal group 40. In this case, the ID of the cache memory (for example, an address range in the memory) may be associated with each journal group 40 in the journal group table 300, and a cache memory metric value (for example, the allocation of available capacity to the capacity of the cache memory) may be collected at a predetermined cycle and registered in a predetermined table. Data input/output to/from the PVOL 42 is stored in the cache memory associated with the journal group 40 to which the PVOL 42 belongs. A cache memory for which the metric value exceeds a threshold is an overloaded cache memory.

FIG. 13 illustrates the configuration of the graph characteristics classification table 340.

The graph characteristics classification table 340 is used to determine the graph characteristics (for example, patterns) into which a graph is to be classified, and comprises a record for each graph characteristic. Each record comprises the fields of pattern ID 341, X-axis condition 342, Y-axis condition 343, and graph characteristics 344.

The ID of a pattern that serves as a graph characteristic is registered in the pattern ID 341. A condition for a time t on the X axis of the graph is registered in the X-axis condition 342. A condition for a value y on the Y axis of the graph is registered in the Y-axis condition 343. Information describing graph characteristics is registered in the graph characteristics 344.

According to the graph characteristics classification table 340 illustrated in FIG. 13, the following characteristics are defined.

(1) A graph comprising the graph characteristic "decrease after exceeding threshold" corresponds to patterns ID "1". For example, the graph corresponds to the pattern ID "1" in a case where, in a graph of a time period T, a time tm of a maximum value ymax (x coordinate corresponding to maximum y coordinate of graph) is further in the past than a time tn of a minimum value ymin (x coordinate corresponding to minimum y coordinate of graph) (tm<tn), and, in addition, a value ya of the time period T start time ta (y coordinate corresponding to starting point x coordinate) is equal to or larger than a value yb of the time period T end time tb (y coordinate corresponding to ending point x coordinate) (ya≥yb).

(2) A graph comprising the graph characteristic "first oscillation" corresponds to the pattern ID "2". For example, the graph corresponds to the pattern ID "2" in a case where, in a graph of the time period T, the time tm of the maximum value ymax is further in the past than the time tn of the minimum value ymin (tm<tn), and, in addition, the value ya of the start time ta is smaller than the value yb of end time tb (ya<yb).

(3) A graph comprising the graph characteristic "second oscillation" corresponds to the pattern ID "3". For example, the graph corresponds to the pattern ID "3" in a case where, in a graph of the time period T, the time tm of the maximum value ymax is further in the future than the time tn of the minimum value ymin (tm>tn), and, in addition, the value ya of the start time ta is equal to or larger than the value yb of end time tb (ya≥yb).

(4) A graph comprising the graph characteristic "increase" corresponds to the pattern ID "4". For example, the graph corresponds to the pattern ID "4" in a case where, in a graph of the time period T, the time tm of the maximum value ymax is further in the future than the time tn of the minimum value ymin (tm>tn), and, in addition, the value ya of the start time ta is smaller than the value yb of end time tb (ya<yb).

(5) A graph comprising the graph characteristic "fixed" corresponds to the pattern ID "5". For example, the graph corresponds to the pattern ID "5" in a case where, in a graph of the time period T, the time tm of the maximum value ymax is equal to the time tn of the minimum value ymin (tm=tn), and, in addition, the value ya of the start time ta is equal to the value yb of end time tb (ya=yb).

The information collection program 1011, in addition to the functions described in the first example, also collects and registers information related to tables 300, 320, and 340. The delay analysis program 1015 may create a graph (referred to as "processor operating rate graph") representing fluctuations in the operating rate of either processor 31 or 32 based on the information of the processor usage table 320.

The delay analysis program 1015 determines whether a graph in a certain time period corresponds to any of the pattern IDs 341 of the graph characteristics classification table 340. For example, the delay analysis program 1015 determines whether the graph in the time period T corresponds to the X-axis condition 342 and the Y-axis condition 343 of any record in the graph characteristics classification table 340. When a corresponding record exists, the delay analysis program 1015 determines that the graph in the time period T comprises the graph characteristic 344 of the pattern ID 341 in the records corresponding thereto.

The delay analysis program 1015 retrieves from within the PVOL search range a PVOL 42 corresponding to a metric value graph for which the relationship of the delay-deteriorated journal group 40 to the delay duration graph meets a predetermined condition. In so doing, the delay analysis program 1015 determines whether or not an overloaded shared processor (an example of an overloaded shared resource) associated with the delay-deteriorated journal group 40 exists in the primary storage apparatus 11. When there is no such overloaded shared processor 31, the delay analysis program 1015 limits the PVOL search range to only the PVOLs 42 that belong to the delay-deteriorated journal group 40. Alternatively, when such an overloaded shared processor 31 exists, the delay analysis program 1015 sets the PVOL search range to not only the PVOLs 42 that belong to the delay-deteriorated journal group 40, but to the PVOLs 42 that belong to all the other journal groups 40 associated with the overloaded shared processor 31. An increase on the number of writes to a PVOL 42 belonging to a second journal group 40 that is separate from the first journal group 40 for which the delay duration is deteriorating causes a processor (shared processor) 31 associated with two or more journal groups 40 that include the first and the second journal groups 40 to become overloaded, thereby raising the possibility of the delay duration for the first journal group 40 deteriorating. According to this example, it is possible to optimize the size of the PVOL search range in accordance with the existence of an overloaded shared processor 31 associated with the delay-deteriorated journal group 40.

The delay analysis program 1015 narrows down the metric value graphs targeted for display to the metric value graphs that resulted in hits during the retrieval (or, infers that the PVOL 42 corresponding to a metric value graph that produced a hit is the cause of delay deterioration) by retrieving a metric value graph for which the relationship with the delay duration graph meets a predetermined condition. For example, of all of the number-of-writes graphs corresponding to all the PVOLs that belong to the PVOL search range, the delay analysis program 1015 may display only the number-of-writes graph that comprises the same graph characteristic as the graph characteristic (for example, pattern) of the delay duration graph. Specifically, for example, the delay analysis program 1015 refers to the graph characteristics classification table 340 and identifies the pattern ID of the delay duration graph. Then, the delay analysis program 1015 identifies a number-of-writes graph that comprises the same pattern ID as the identified pattern ID. The delay analysis program 1015 displays the identified number-of-writes graph (or, infers that the PVOL corresponding to the number-of-writes graph is the cause of delay deterioration). Furthermore, the delay analysis program 1015 may employ another metric value graph (for example, a write quantity graph) instead of the number-of-writes graph as the graph for comparison to the delay duration graph.

The identification of a number-of-writes graph comprising the same pattern ID as the pattern ID of the delay duration graph will be explained in detail below.

Figure 14:
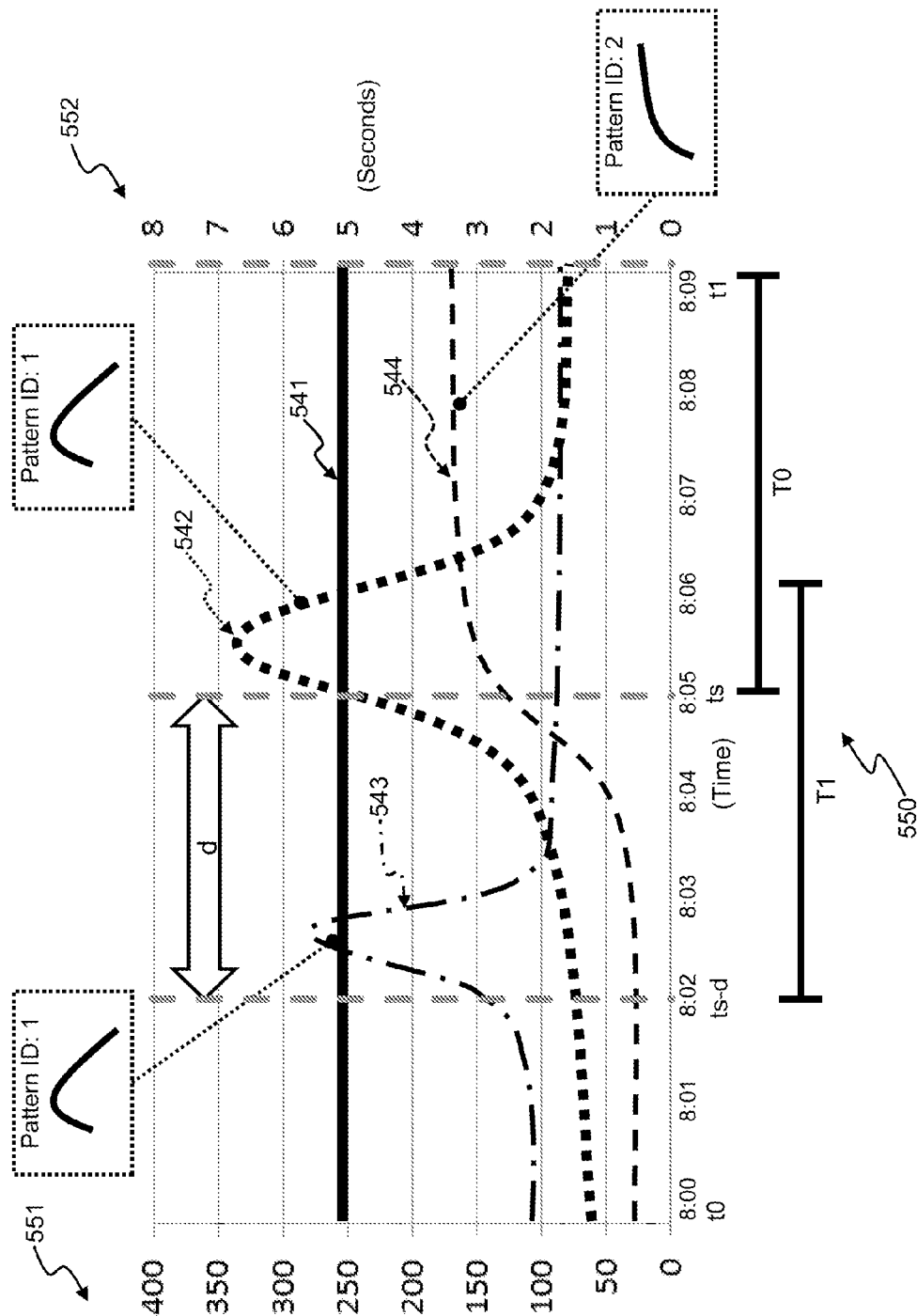
FIG. 14 illustrates an example of the identification of the same characteristic in a graph.

FIG. 14 illustrates an example of the identification of graphs that have the same graph characteristic.

The X axis (horizontal axis) 550 represents time, the left-side Y axis (vertical axis) 551 represents an index related to the number of writes, and the right-side Y axis 552 represents the delay duration. In this arrangement, "t0" is the start time and "t1" is the end time for the entire graph 540. The end time t1 may be the most recent time at which the information collection program 1011 collected information. Also, the delay deterioration time "ts" is the time at which a delay duration graph 542 exceeded a predetermined delay threshold 541. In addition, "T0" is the time period "from delay deterioration time ts to end time t1".

First, the delay analysis program 1015 determines whether the delay duration graph 542 in the time period T0 corresponds to any pattern ID.

Next, the delay analysis program 1015 lets "T1" be the time period from "time (ts−d) to time (t1−d)". In this arrangement, d has an initial value of 0, and is a variable that increases in increments of a predetermined value Δd. That is, the time period T1 is the time period achieved by shifting the time period T0 by d in the past time direction.

Next, the delay analysis program 1015 respectively determines whether a number-of-writes graph in the time period T1 (number of times graph corresponding to a certain PVOL 42) 543 and a number-of-writes graph in the time period T1 (number-of-writes graph corresponding to another PVOL 42) 544 correspond to any of the pattern IDs. In so doing, the delay analysis program 1015 increases d from 0 to (ts–t0) in increments of Δd (that is, shifts T1 toward a past time one Δd at a time), and determines whether any pattern ID of either number-of-writes graph 543 or 544 in the time period T1 matches the pattern ID of the delay duration graph 542.

When any pattern ID of either number-of-writes graph 543 or 544 in the time period T1 matches the pattern ID of the delay duration graph 542, the delay analysis program 1015 makes the matching number-of-writes graph the display target (or, infers that the PVOL 42 corresponding to the matching number-of-writes graph is the cause of delay).

Specifically, for example, the delay analysis program 1015 identifies that the pattern ID of the delay duration graph 542 in time period T0 corresponds to "1". The delay analysis program 1015 also identifies that the number-of-writes graph 543 in time period T1 corresponds to the pattern ID "1", and that the number-of-writes graph 544 corresponds to the pattern ID "2". Therefore, the delay analysis program 1015 decides that the number-of-writes graph 543 for which the pattern ID matches that of the delay duration graph will be the display target, and does not target the number-of-writes graph 544 for which the pattern ID does not match that of the delay duration graph for display.

Figure 15:
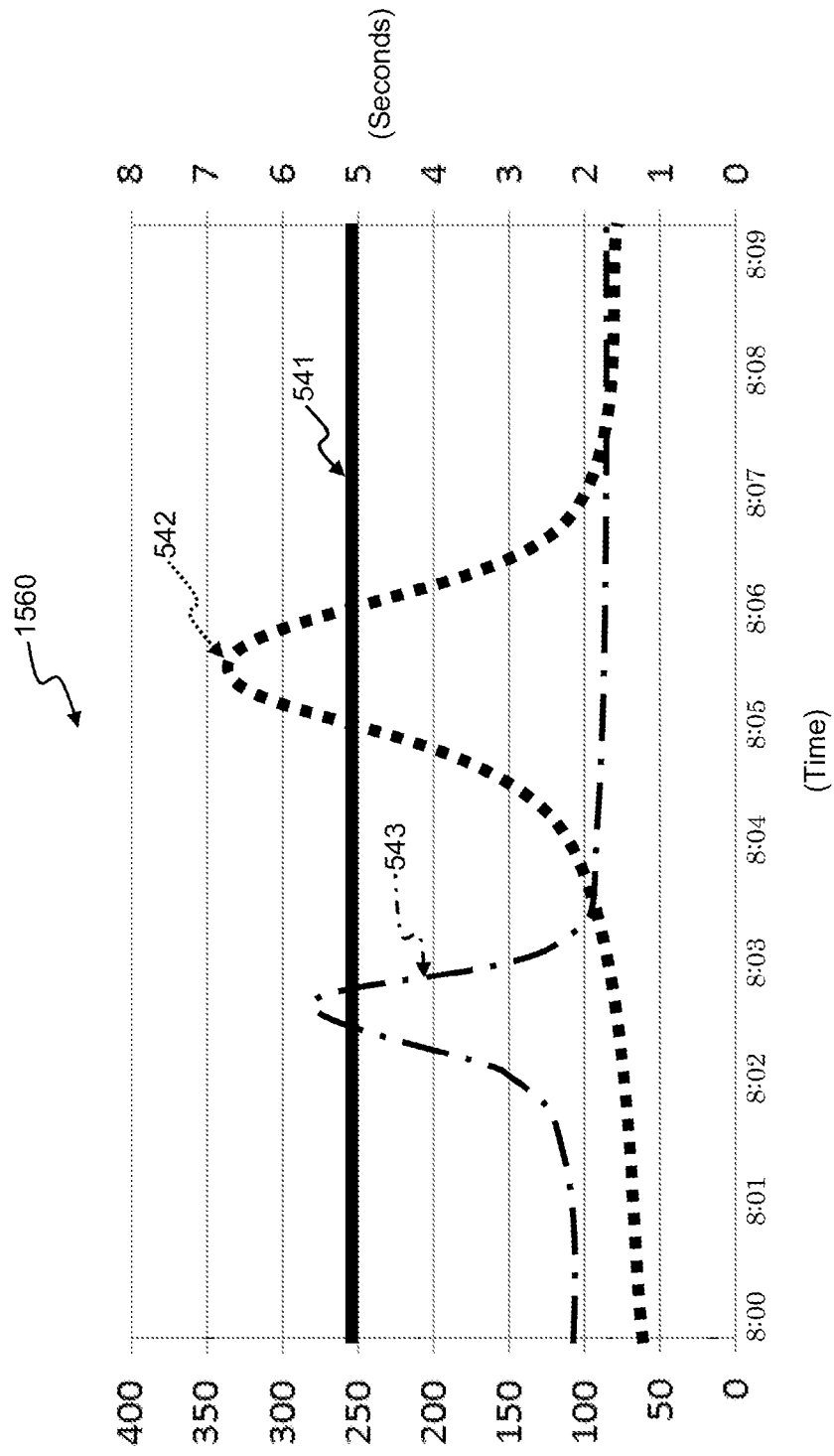
FIG. 15 illustrates an example of a graph screen related to the second example.
Figure 16:
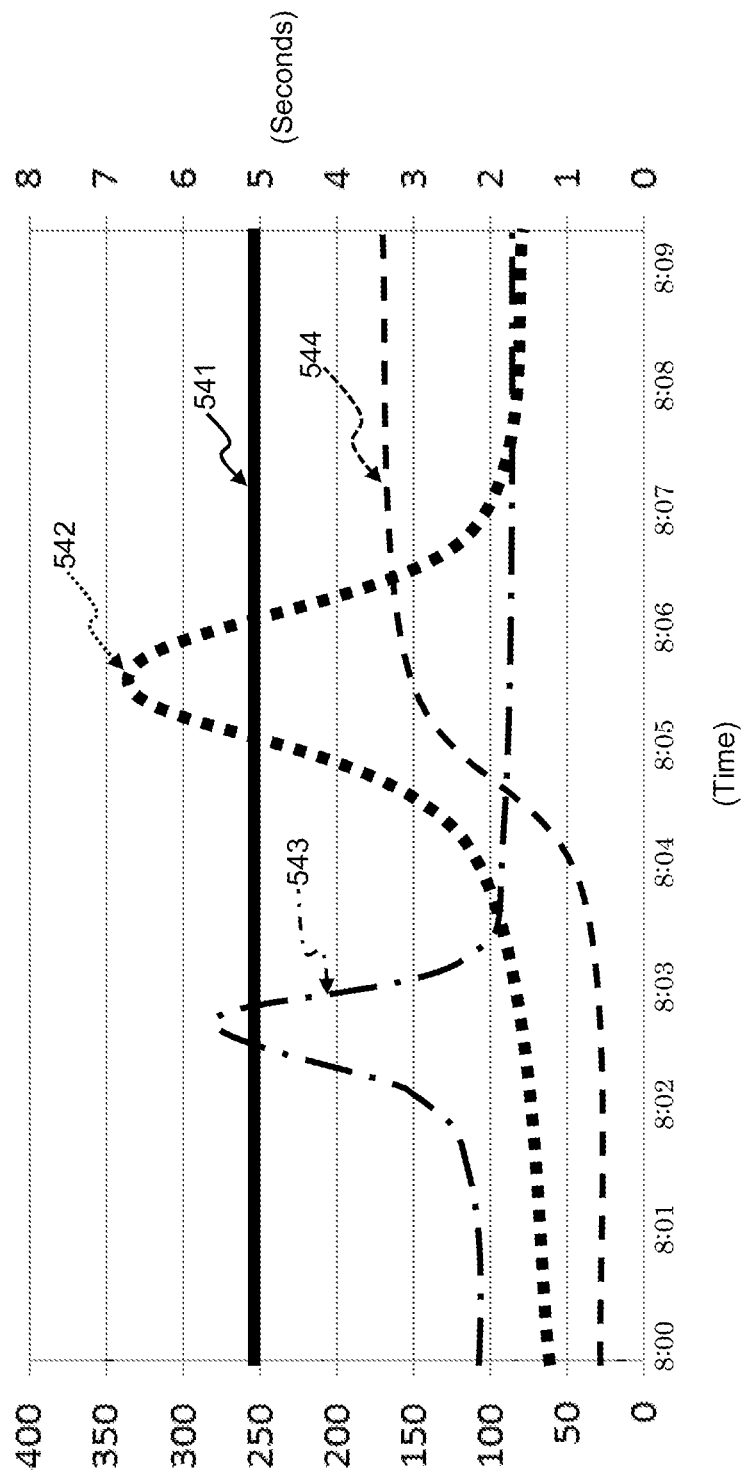
FIG. 16 illustrates a comparative example of the graph screen related to the second example.

The delay analysis program 1015 displays the graph screen 1560 illustrated in FIG. 15. In the graph screen 1560, in addition to the delay duration threshold 541 and the delay duration graph 542, only the number-of-writes graph 543, the pattern ID of which matches that of the delay duration graph 542, is displayed; the number-of-writes graph 544 in which the pattern ID does not match that of the delay duration graph 542 is not displayed. Thus, the display-target graph is narrowed down to the graph that is associated with the delay duration graph 542, thereby enhancing the readability of the graph, so the administrator can easily infer that the PVOL is the cause of the delay deterioration. As illustrated in FIG. 16, when the graphs for all of the PVOLs belonging to the PVOL search range are displayed without narrowing down the display-target graphs (when graph 544 is displayed in addition to graph 543), graph readability worsens, in a case where a large number of PVOLs exists within the PVOL search range in particular, makes it difficult to infer the PVOL that is the cause of the delay deterioration.

Figure 17:
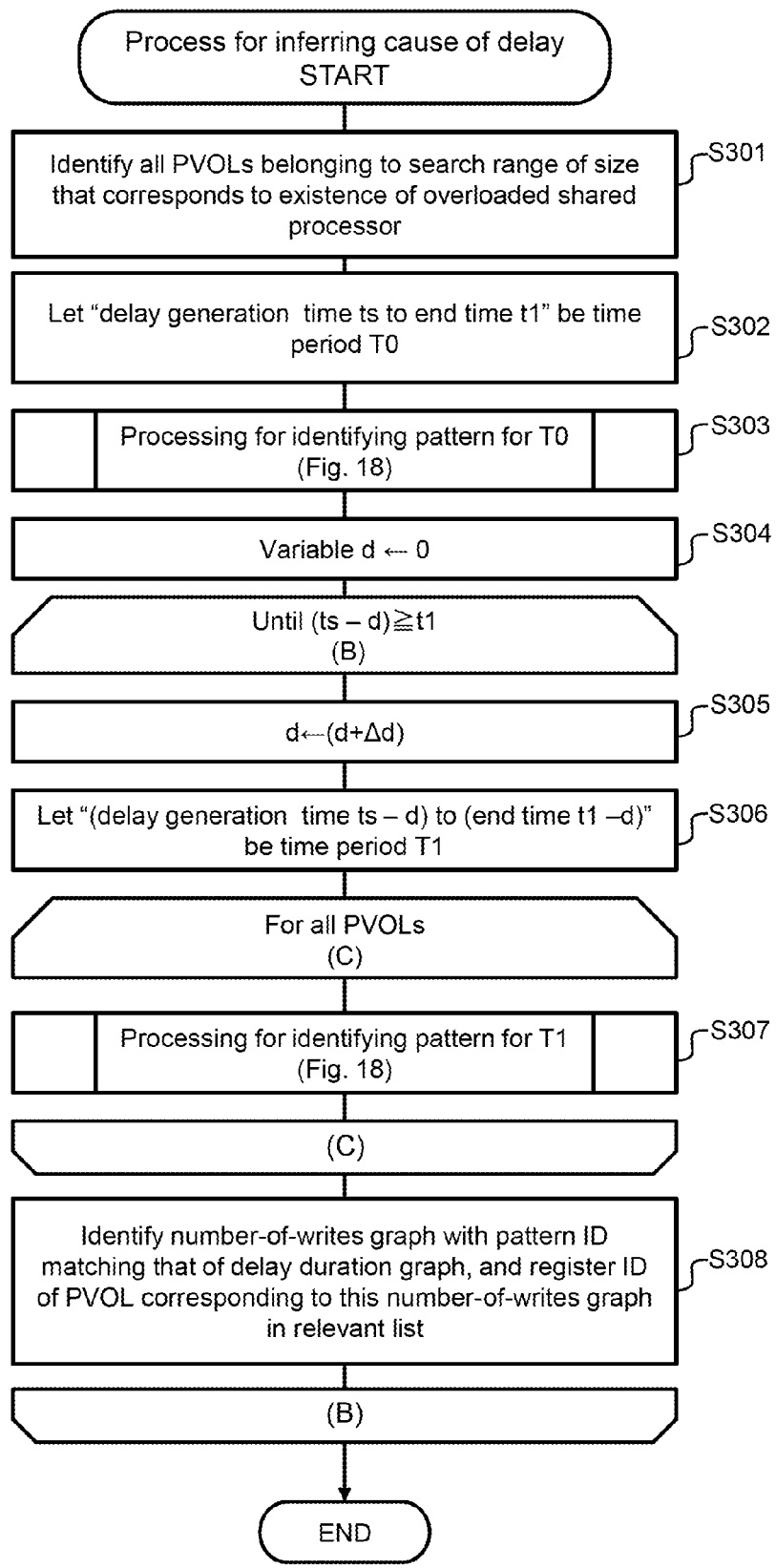
FIG. 17 is a flowchart of processing for inferring the cause of a delay.

FIG. 17 is a flowchart of the processing for inferring the cause of a delay.

The delay analysis program 1015 identifies all the PVOLs 42 belonging to the PVOL search range that corresponds to the existence of an overloaded shared processor 31 associated with a delay-deteriorated journal group 40 (S301). The delay analysis program 1015 lets the "delay deterioration time is to end time t1" be the time period T0 (S302).

The delay analysis program 1015 performs a pattern identification process with respect to the time period T0, that is, identifies the pattern ID of the delay duration graph in time period T0 (S303). The pattern identification process will be explained below by referring to FIG. 18.

The delay analysis program 1015 configures (initializes) "0" in the variable d (S304). The delay analysis program 1015 repeats S305 through S308 until "(delay deterioration time ts–variable d)≥end time t1".

Specifically, the delay analysis program 1015 adds a predetermined value Δd to the variable d (S305), and lets "(delay deterioration time ts–variable d) to (end time t1–variable d)" be the time period T1 (S306). The delay analysis program 1015 performs pattern identification processing for the time period T1 for each of the PVOLs 42 identified in S301, that is, identifies the pattern ID of the number-of-writes graph in the time period T1 (S307). The delay analysis program 1015 identifies the number-of-writes graph having a pattern ID matching the pattern ID of the delay duration graph, and registers the ID of the PVOL 42 corresponding to the identified number-of-writes graph in a relevant list (S308).

In accordance with the above processing, the ID of the PVOL 42 corresponding to the number-of-writes graph having a pattern ID that matches the pattern ID of the delay duration graph is registered in the relevant list. That is, the ID of the PVOL 42 that is presumed to be the cause of the delay deterioration is registered in the relevant list. The delay analysis program 1015 refers to this relevant list, and decides the number-of-writes graph to be displayed together with the delay duration graph. Specifically, the number-of-writes graph of the PVOL identified from the ID registered in the relevant list is decided as the display target.

Figure 18:
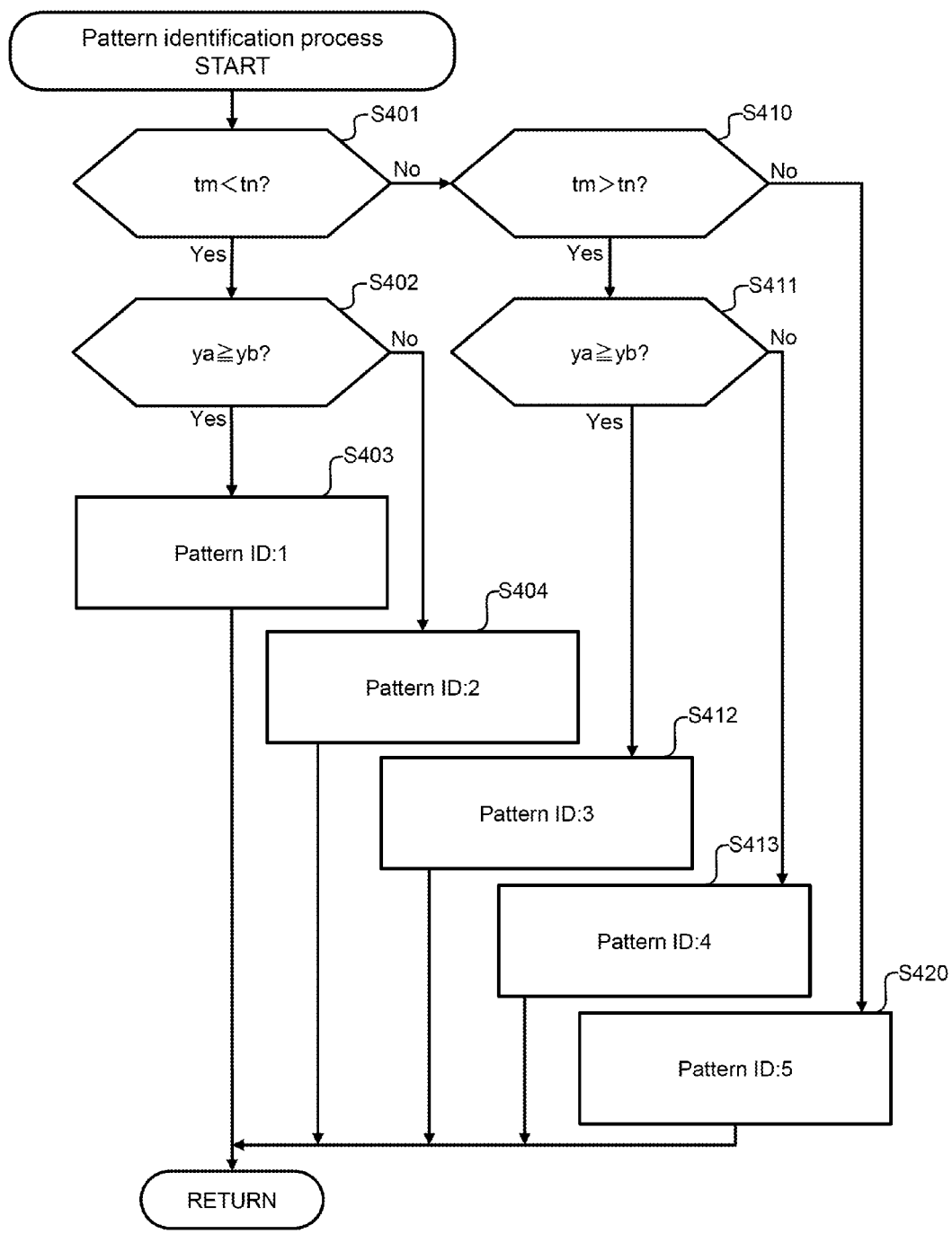
FIG. 18 is a flowchart of processing for identifying a pattern.

FIG. 18 is a flowchart of the processing for identifying a pattern.

The pattern identification process is performed in S303 and S307 of FIG. 17. When this process is a detailed breakdown of S303, in the explanation of FIG. 18, "target graph" is equivalent to the delay duration graph, and time period T is equivalent to the time period T0. When this process is a detailed breakdown of S307, in the explanation of FIG. 18, "target graph" is equivalent to the number-of-writes graph corresponding to a single PVOL, and time period T is equivalent to the time period T1.

The delay analysis program 1015 refers to the graph characteristics classification table 340 and executes the following processing.

That is, the delay analysis program 1015 determines whether or not the time tm of the maximum value ymax is further in the past than the time to of the minimum value ymin (tm<tn) for the target graph in the time period T (S401).

When the determination result of S401 is affirmative (S401: YES), the delay analysis program 1015 determines whether or not the value ya of the time period T start time to is equal to or larger than the value yb of the time period T end time tb (ya≥yb) (S402). When the determination result of S402 is affirmative (S402: YES), the delay analysis program 1015 identifies the pattern ID of the target graph as being "1". When the determination result of S402 is negative (S402: NO), the delay analysis program 1015 identifies the pattern ID of the target graph as being "2".

When the determination result of S401 is negative (S401: NO), the delay analysis program 1015 determines whether or not the time tm of the maximum value ymax in the time period T is further in the future than the time to of the minimum value ymin in the time period T, for the target graph in the time period T (S410). When the determination result of S410 is negative (S410: NO), the delay analysis program 1015 identifies the pattern ID of the target graph as being "5". When the determination result of S410 is affirmative (S410: YES), the delay analysis program 1015 determines whether or not the value ya of the time period T start time to is equal to or larger than the value yb of the time period T end time tb (ya≥yb), for the target graph in the time period T (S411). When the determination result of S411 is affirmative (S411: YES), the delay analysis program 1015 identifies the pattern ID of the target graph as being "3". When the determination result of S411 is negative (S411: NO), the delay analysis program 1015 identifies the pattern ID of the target graph as being "4".

According to the above processing, the pattern ID of the target graph is identified.

Figure 19:
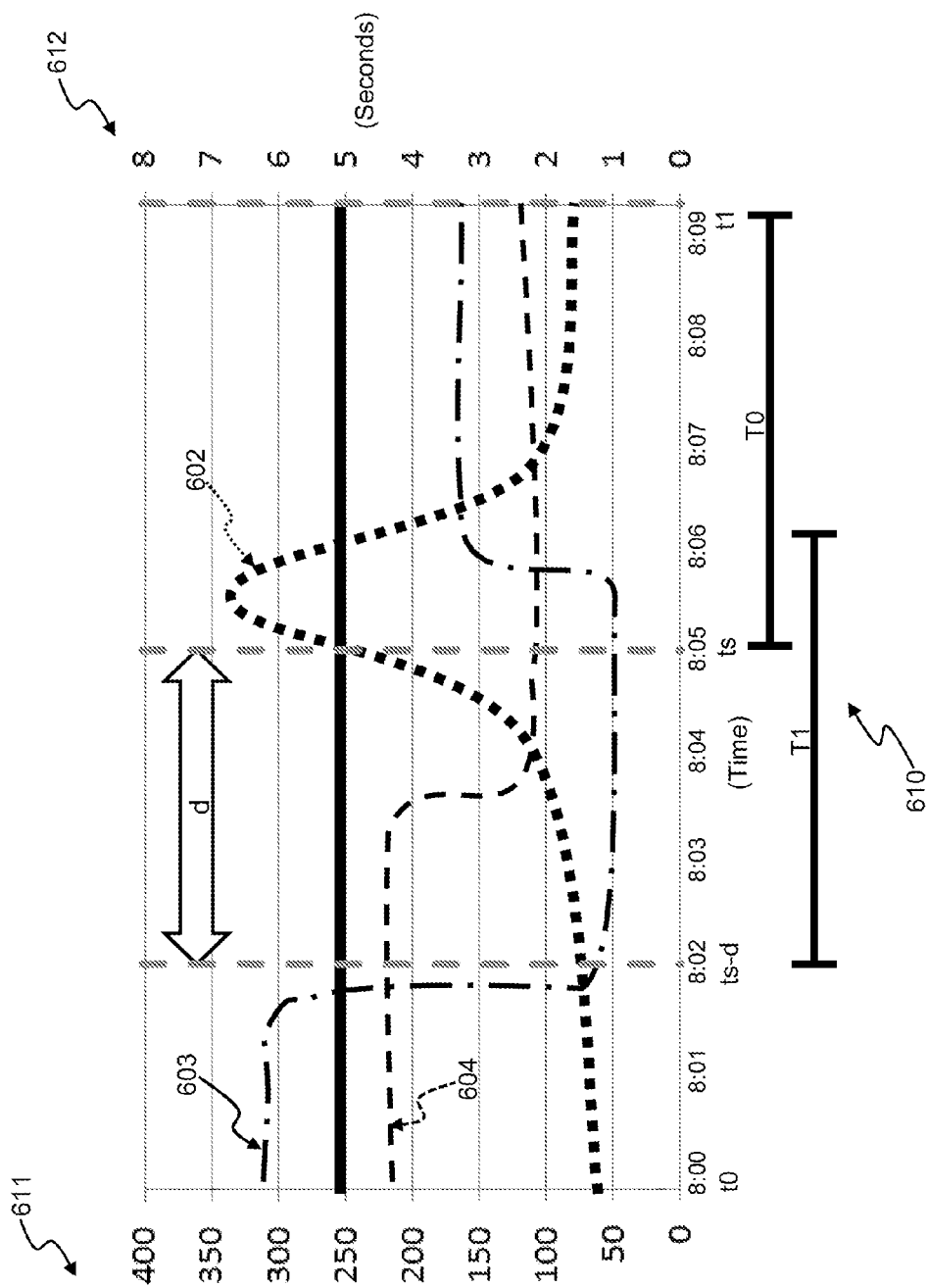
FIG. 19 illustrates an example of the identification of an average-of-writing-quantity graph for which the relationship with a delay duration graph meets a predetermined condition.

FIG. 19 illustrates an example of the identification of an average-of-writing-quantity graph for which the relationship with a delay duration graph meets a predetermined condition.

The X axis (horizontal axis) 610 represents time, the left-side Y axis (vertical axis) 611 represents an index related to the write quantity, and the right-side Y axis 612 represents the delay duration. In this arrangement, "t0" is the start time, "t1" is the end time, "ts" is the delay deterioration time, and "T0" is the time period "from delay deterioration time ts to end time t1".

The delay analysis program 1015, for example, infers the cause of delay as follows.

(S19-1) The delay analysis program 1015 identifies all the PVOLs 42 belonging to a PVOL search range of a size that corresponds to the existence of an overloaded shared processor 31 associated with the delay-deteriorated journal group 40.

(S19-2) The delay analysis program 1015 configures the time period T1 obtained by shifting the time period T0 (from delay deterioration time ts to end time t1) in proportion to variable d in the past time direction.

(S19-3) The delay analysis program 1015 calculates the average of writing quantity in the time period T1 for each PVOL 42 identified in (19-1).

(S19-4) The delay analysis program 1015 registers the ID of a PVOL 42 with an average of writing quantity that is smaller that a predetermined threshold in the relevant list.

(S19-5) The delay analysis program 1015 adds a predetermined value Δd to the variable d and returns the processing to (S19-2).

For example, in the time period T1, it is assumed that the average-of-writing-quantity graph 603 for a first PVOL 42 represents an average of writing quantity of "around 50 Bytes", and that the average-of-writing-quantity graph 604 for a second PVOL 42 represents an average of writing quantity of "around 250 Bytes". When the threshold is "100 Bytes", the delay analysis program 1015 registers the ID of the first PVOL 42 for which the average of writing quantity is smaller than the predetermined threshold in the relevant list. That is, the delay analysis program 1015 presumes the first PVOL 42 to be the cause of the delay. This is because a PVOL with a small average of writing quantity is likely to have a large number of writes.

Of the average-of-writing-quantity graphs 603 and 604, the delay analysis program 1015 may display only the average-of-writing-quantity graph 603 corresponding to the PVOL ID registered in the relevant list on the graph screen, and may hide the average-of-writing-quantity graph 604 corresponding to the PVOL ID that is not registered in the relevant list.

A number of examples have been explained hereinabove, but these examples are exemplifications for explaining the present invention, and do not purport to limit the scope of the present invention solely to these examples. A person of ordinary skill in the art will be able to put the present invention into practice using various other modes without departing from the gist of the present invention.

For example, a program executed by the management server 10 may be executed by another apparatus such as a host computer or a storage apparatus.

Furthermore, for example, the delay analysis program 1015 may identify a graph related to the delay duration graph using a method that differs from that described above. Specifically, the delay analysis program 1015 may identify a graph related to the delay duration graph on the basis of normalization, frequency analysis, or a correlation.

In addition, in place of at least one of the PJVOL and SJVOL, an area reserved on the cache memory may be an example of a journal storage area.

REFERENCE SIGNS LIST

10 Management server
11 Primary storage apparatus
12 Secondary storage apparatus
13*a*, 13*b* Host computers
14 Management client
40*a*, 40*b* Journal groups
42*a*, 42*b* Primary volumes (PVOLs)
43*a*, 43*b* Primary journal volumes (PJVOLs)
47*a*, 47*b* Secondary volumes (SVOLs)
48*a*, 48*b* Secondary journal volumes (SJVOLs)

The invention claimed is:

1. A management system comprising:
a communication interface device connected to a computer system that includes a remote copy system for performing asynchronous remote copy;
a storage resource; and
a processor connected to the communication interface device and the storage resource,
wherein the remote copy system comprises a primary storage system, and a secondary storage system connected to the primary storage system,
the primary storage system comprises a plurality of primary volumes, each primary volume into which data is written, and a primary journal storage area into which is written a journal comprising the data written to the respective primary volume, and transfers the journal that has been written to the primary journal storage area to the secondary storage system, and
the secondary storage system comprises a secondary journal storage area into which the journal from the primary storage system is written, and a plurality of secondary volumes corresponding to the plurality of primary volumes, each respective secondary volume into which is written the respective data inside the journal being stored in the secondary journal storage area,
the computer system further comprises a host computer that sends a write request specifying a primary volume,
the storage resource stores management information that includes a plurality of delay durations that respectively correspond to a plurality of times, and a plurality of metric values that respectively correspond to the plurality of times for the respective primary volume,
for each delay duration, a start time is either a time at which data was stored in the respective primary volume, or a time at which a journal comprising this data was stored in the primary journal storage area, and an end time is either a time at which this journal was stored in the secondary journal storage area, or a time at which data inside this journal was stored in the respective secondary volume, and
the processor is configured to:

refer to the management information;
identify a primary volume that corresponds to a metric value fluctuation for which the relationship to a delay duration fluctuation meets a predetermined condition;
display, based on the management information, a delay duration graph representing a fluctuation in delay duration associated with the passage of time and an average-of-writing-quantity graph representing a fluctuation in average of writing quantity associated with the passage of time, in a mode that enables comparison between the two graphs, the average of writing quantity being an amount of data written to the primary volume per write request; and
display a metric value graph in a mode that enables comparison with the delay duration graph, only for the identified primary volume of the plurality of primary volumes.

2. A management system according to claim 1, wherein the processor displays the delay duration graph and the average-of-writing-quantity graph on the same graph screen,
in the graph screen, a first axis corresponds to time,
in the graph screen, a second axis, which is one of axes orthogonal to the first axis, corresponds to delay duration, and
in the graph screen, a third axis, which is the other of the axes orthogonal to the first axis, corresponds to average of writing quantity.

3. A management system according to claim 1, wherein the plurality of metric values that respectively correspond to the plurality of times is a plurality of number of writes that respectively correspond to the plurality of times, and a plurality of write quantities that respectively correspond to the plurality of times,
the number of writes is the number of write requests per unit of time, and
a write quantity is an amount of data written per unit of time,
the processor being configured to calculate an average of writing quantity by dividing the write quantity by the number of writes for each of the plurality of times.

4. A management system according to claim 1, wherein the processor is configured to identify, from a primary volume search range, a primary volume that corresponds to the metric value fluctuation for which the relationship to a delay duration fluctuation meets a predetermined condition,
the remote copy system comprises one or more journal groups,
each journal group comprises one or more primary volumes, one or more primary journal storage areas, one or more secondary journal storage areas, and one or more secondary volumes,
the primary volume search range is all the primary volumes belonging to a delay-deteriorated journal group, and
the delay-deteriorated journal group is a journal group for which the delay duration has exceeded a delay threshold.

5. A management system according to claim 4, wherein the remote copy system comprises a plurality of journal groups,
the primary storage system comprises a plurality of physical resources associated with the plurality of journal groups,
the plurality of physical resources includes a shared physical resource, which is a physical resource that is associated with two or more journal groups of the plurality of journal groups,
the management information includes a plurality of metric values that respectively correspond to the plurality of times for each of the plurality of physical resources,
the processor, when there is no overloaded shared physical resource associated with the delay-deteriorated journal group, is configured to extend the primary volume search range to all primary volumes belonging to the delay-deteriorated journal group, and
the processor, when there is an overloaded shared physical resource associated with the delay-deteriorated journal group, is configured to extend the primarily volume search range to all the primary volumes belonging to all other journal volumes associated with the delay-deteriorated journal group in addition to all the primary volumes belonging to the delay-deteriorated journal group, and
the overloaded shared physical resource associated with the delay-deteriorated journal group is a shared physical resource for which a metric value exceeds a metric threshold in a time period further in the past than a time at which the delay duration exceeded a threshold.

6. A management system according to claim 5, wherein the metric value graph is a graph of the number of writes, which is the number of write requests per unit of time.

7. A management system according to claim 1, wherein the metric value fluctuation for which the relationship to a delay duration fluctuation meets a predetermined condition is a metric value graph comprising a graph characteristic that is the same as a graph characteristic of the delay duration graph,
the graph characteristic of the delay duration graph is a graph characteristic in a future time period based on a time at which a delay duration exceeded the delay threshold, and
the same graph characteristic of the metric value graph is a graph characteristic of in past time period based on the time at which the delay duration exceeded the delay threshold.

8. A management system according to claim 1, wherein the metric value fluctuation for which the relationship to a delay duration fluctuation meets a predetermined condition is an average of writing quantity fluctuation for which the average of writing quantity is less than a write quantity threshold in a past time period based on a time at which a delay duration exceeded the delay threshold.

9. A computer program stored on a non-transitory computer readable media for execution a computer to manage a computer system that includes a remote copy system for performing asynchronous remote copy,
wherein the remote copy system comprises a primary storage system, and a secondary storage system connected to the primary storage system,
the primary storage system comprises a plurality of primary volumes, each primary volume into which data is written, and a primary journal storage area into which is written a journal comprising the data written to the respective primary volume, and transfers the journal that has been written to the primary journal storage area to the secondary storage system, and
the secondary storage system comprises a secondary journal storage area into which the journal from the primary storage system is written, and a plurality of secondary volumes corresponding to the plurality of primary volumes, each secondary volume into which is written the respective data inside the journal being stored in the secondary journal storage area,
the computer system further comprises a host computer that sends a write request specifying a primary volume, the computer program being configured to:
refer to management information that includes a plurality of delay durations that respectively correspond to a plurality of times and a plurality of metric values that respectively correspond to the plurality of times for the respective primary volume, wherein for each delay duration, a start time is either a time at which data was stored in the respective primary volume, or a time at which a journal comprising this data was stored in the primary journal storage area, and an end time is either a time at which this journal was stored in the secondary journal storage area, or a time at which data inside this journal was stored in the respective secondary volume;
identify a primary volume that corresponds to a metric value fluctuation for which the relationship to a delay duration fluctuation meets a predetermined condition;
display, based on the management information, a delay duration graph representing a fluctuation in delay duration associated with the passage of time and an average-of-writing-quantity graph representing a fluctuation in average of writing quantity associated with the passage of time, in a mode that enables comparison between the two graphs, the average of writing quantity being an amount of data written to the primary volume per write request; and
display a metric value graph in a mode that enables comparison with the delay duration graph, only for the identified primary volume of the plurality of primary volumes.

10. A computer program according to claim 9, wherein the delay duration graph and the average-of-writing-quantity graph are displayed on the same graph screen, and
in the graph screen, a first axis corresponds to time,
in the graph screen, a second axis, which is one of axes orthogonal to the first axis, corresponds to delay duration, and
in the graph screen, a third axis, which is the other of the axes orthogonal to the first axis, corresponds to average of writing quantity.

11. A computer program according to claim 9, wherein the plurality of metric values that respectively correspond to the plurality of times is a plurality of number of writes that respectively correspond to the plurality of times, and a plurality of write quantities that respectively correspond to the plurality of time,
the number of writes is the number of write requests per unit of time, and
a write quantity is an amount of data written per unit of time,
the computer program being configured to cause the computer to calculate an average of writing quantity by dividing the write quantity by the number of writes for each of the plurality of times.

12. A computer program according to claim 9, wherein the computer program causes the computer to identify, from a primary volume search range, a primary volume that corresponds to the metric value fluctuation for which the relationship to a delay duration fluctuation meets a predetermined condition,
the remote copy system comprises one or more journal groups,
each journal group comprises one or more primary volumes, one or more primary journal storage areas, one or more secondary journal storage areas, and one or more secondary volumes,
the primary volume search range is all the primary volumes belonging to a delay-deteriorated journal group, and
the delay-deteriorated journal group is a journal group for which the delay duration has exceeded a delay threshold.

13. A management method for a computer system that includes a remote copy system for performing asynchronous remote copy,
wherein the remote copy system comprises a primary storage system, and a secondary storage system connected to the primary storage system,
the primary storage system comprises a plurality of primary volumes, each primary volume into which data is written, and a primary journal storage area into which is written a journal comprising the data written to the respective primary volume, and transfers the journal that has been written to the primary journal storage area to the secondary storage system, and
the secondary storage system comprises a secondary journal storage area into which the journal from the primary storage system is written, and a plurality of secondary volumes corresponding to the plurality of primary volumes, each secondary volume into which is written the respective data inside the journal being stored in the secondary journal storage area,
the computer system further comprises a host computer that sends a write request specifying a primary volume,
the management method comprising:
referring to management information that includes a plurality of delay durations that respectively correspond to a plurality of times, and a plurality of metric values that respectively correspond to the plurality of times for the respective primary volume, wherein for each delay duration, a start time is either a time at which data was stored in the respective primary volume, or a time at which a journal comprising this data was stored in the primary journal storage area, and an end time is either a time at which this journal was stored in the secondary journal storage area, or a time at which data inside this journal was stored in the respective secondary volume;
identifying a primary volume that corresponds to a metric value fluctuation for which the relationship to a delay duration fluctuation meets a predetermined condition;
displaying, based on the management information, a delay duration graph representing a fluctuation in delay duration associated with the passage of time and an average-of-writing-quantity graph representing a fluctuation in average of writing quantity associated with the passage of time in a mode that enables comparison between the two graphs, the average of writing quantity being an amount of data written to the primary volume per write request; and
displaying a metric value graph in a mode that enables comparison with the delay duration graph, only for the identified primary volume of the plurality of primary volumes.

* * * * *